(12) United States Patent
Kaneko

(10) Patent No.: US 6,709,082 B2
(45) Date of Patent: Mar. 23, 2004

(54) INK JET RECORDING METHOD, INK JET RECORDING DEVICE, IMAGE PROCESSING METHOD, PROGRAM, AND STORAGE MEDIUM

(75) Inventor: Takumi Kaneko, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/238,778

(22) Filed: Sep. 11, 2002

(65) Prior Publication Data

US 2003/0151642 A1 Aug. 14, 2003

(30) Foreign Application Priority Data

Sep. 17, 2001 (JP) ........................................ 2001/282395
Jul. 11, 2002 (JP) ........................................ 2002/203235

(51) Int. Cl.$^7$ ................................................ B41J 2/21
(52) U.S. Cl. ............................................ 347/15; 347/43
(58) Field of Search ............................ 347/15, 43, 100, 347/14, 16

(56) References Cited

U.S. PATENT DOCUMENTS 5,568,169 A * 10/1996 Dudek et al. ................. 347/43

FOREIGN PATENT DOCUMENTS

JP          55-65269          5/1980

* cited by examiner

Primary Examiner—Lamson Nguyen
(74) Attorney, Agent, or Firm—Fitzpatrick, Cella, Harper & Scinto

(57) ABSTRACT

An ink jet recording method for shortening fixing time as well as preventing deterioration of recording by using a low-permeability first ink (e.g., black ink). In the event that a first ink with a predetermined permeability (e.g., black ink) and second ink having higher permeability than the predetermined permeability (e.g., color ink) are employed in recording, decision is made regarding whether to provide the second ink to a predetermined region where the first ink is provided, based upon provision conditions of the first ink for the predetermined region of the recording medium. Specifically, in the event that discharging duty of black ink for the predetermined region is great, color ink is provided to the region to which black ink is also provided, in an overlapping manner.

18 Claims, 18 Drawing Sheets

FIG. 15A
FIG. 15B
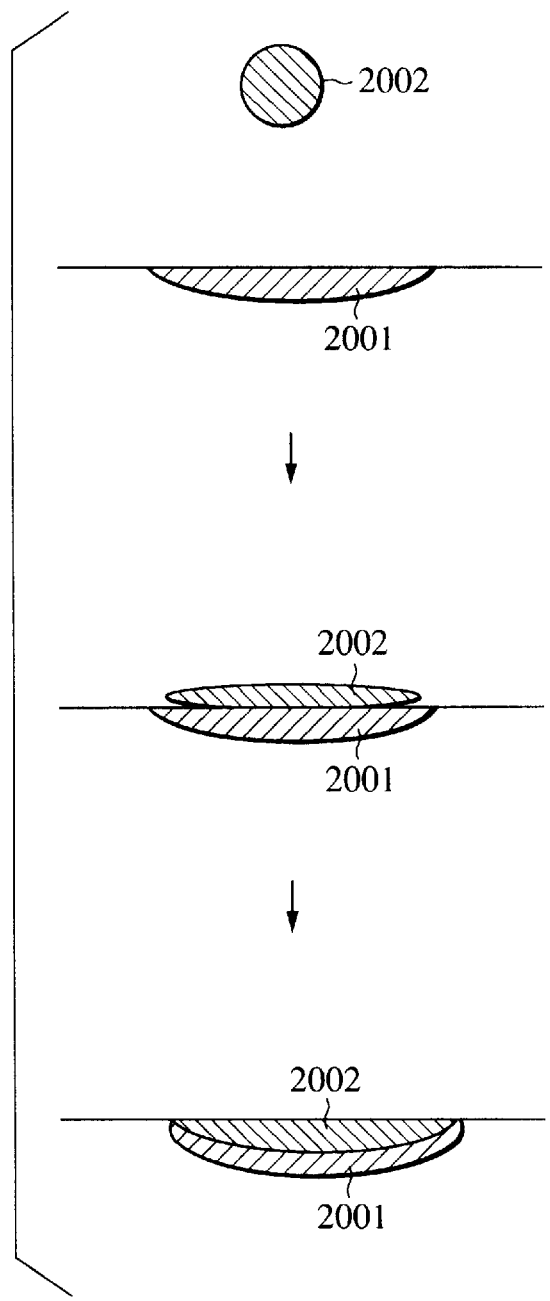
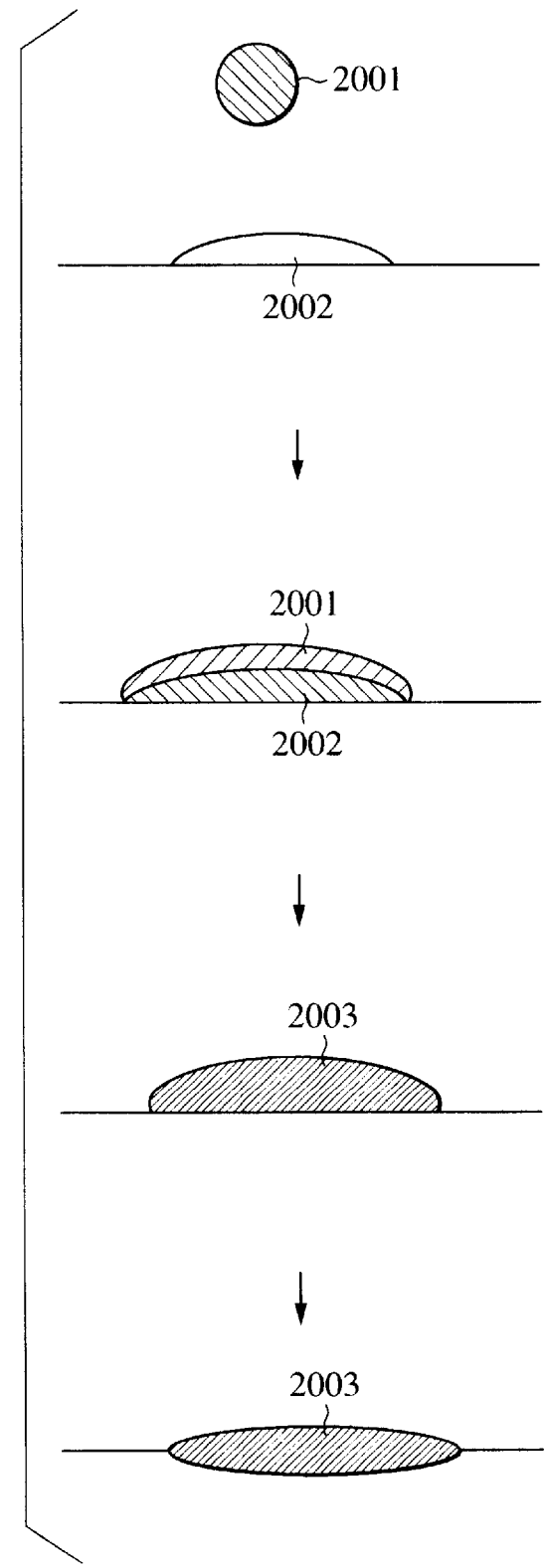

INK JET RECORDING METHOD, INK JET RECORDING DEVICE, IMAGE PROCESSING METHOD, PROGRAM, AND STORAGE MEDIUM

BACKGROUND OF THE INVENTION

1. Field of the Invention

The present invention relates to an ink jet recording method and ink jet recording device wherein inks having different permeability, such as a black ink and color ink, are discharged onto a recording medium to form images, and particularly relates to enhancement of recording speed and recording quality thereof.

2. Description of the Related Art

Conventionally, ink jet recording methods and ink jet recording devices for performing recording on various types of recording media are widely applied to output means and so forth of various devices, due to their capability of high density and high speed recording operations.

In general, an ink jet recording device comprises recording means (recording head), a carriage for mounting ink tanks, transport means for transporting a recording medium (recording paper), and control means for controlling these units. While ink is discharged from multiple discharging orifices as a recording head for discharging ink droplets is transferred along a direction (main scanning direction) orthogonal to the transfer direction of the recording medium (sub scanning direction) so as to perform serial scanning, the recording medium is transferred intermittently at the time of non-recording by amounts equal to the width which has been recorded.

Also, since ink jet recording devices perform recording by discharging ink onto the recording medium in response to recording signals, it is known that the running costs thereof are inexpensive, and the quietness thereof is excellent. Also, in recent years, a great number of products capable of color recording have been marketed, employing a plurality of colors of inks.

With color ink jet recording devices capable of handling color recording, black ink is often used for printing characters, with sharpness, clearness, and high recording density in printing being required. In one known technique, the permeability of the black ink is reduced so as to control the infiltration of coloring matter of the black ink into the recording medium. In another known technique for color ink, the permeability of the color ink is raised so as to prevent color inks from mixing one with another on the surface of the recording medium, to prevent bleeding. Bleeding is a problem which occurs in the event that two different kinds of inks are disposed on the recording medium adjacent to each other, and the inks mix mutually at the boundary thereof, thereby degrading the quality of color images (for example, see Japanese Patent Laid-Open No. 55-65269).

However, when using the ink described above, the color ink is fixed in a relatively short time due to the high permeability thereof, while the black ink requires a relatively long time for drying and fixing due to the low permeability thereof. Therefore, when a subsequent recording medium is printed and discharged after a preceding recording medium is printed and discharged, the subsequent recording medium may be discharged before the black ink on the preceding recording medium has dried completely. In this case, trouble occurs wherein the recording face of the preceding recording medium and the back face of the subsequent recording medium are soiled (the phenomena wherein the recording face and back face of the recording mediums are soiled is called smearing below). This problem becomes increasingly serious as the printing speed increases. So far, the measures described below have been employed for resolving smearing.

In one measure, a method has been employed wherein a fixing device is provided for fixing the ink on the recording face of the recording device. An example of such a fixing device is a thermal fixing device, where the moisture of the ink transported thereto is dried almost completely thereby producing excellent fixing results. However, this leads to enlargement and cost increases of the recording device, and therefore the particular advantages of ink jet recording, i.e., reductions in size and cost, cannot be realized. Also, with serial printers, while the transportation of the recording medium is performed intermittently, irregularities in transfer might occur due to the processing by the fixing device.

As a second measure, a discharge paper waiting control, where the discharge of the recording medium is temporally stopped, is employed. More specifically, this control involves temporarily stopping printing of a subsequent recording medium, or temporarily stopping the discharge operation of the subsequent recording medium following the completion of printing thereof, until the preceding recording medium has dried completely following printing thereof. Such control can prevent smearing from occurring. However, in the event of performing such control, sufficient printing speed can not be achieved. Recent ink jet recording devices are capable of high speed recording such as 15 to 20 sheets per minute. Recording speed is an important element which symbolizes the performance of the device, but when performing the foregoing control, the printing speed is reduced, thereby deteriorating the performance of the device.

As a third measure, a method is employed in which high permeability color ink is placed on the black ink recording regions. In this case, since the black ink is recorded on the paper surface which has been wetted by the color ink, the black ink is easily fixed to the paper surface, and accordingly the occurrence of smearing can be prevented.

However, with this method, due to the color ink being recorded on the black ink recording regions, deterioration of the sharpness of black images and deterioration of the black character quality occur together. Also, when color ink is provided to all black data regions, a great deal of the color ink is used, which causes a problem in that the cost per print increases.

SUMMARY OF THE INVENTION

The present invention has been made in view of the foregoing problems of the above-described conventional art. Accordingly, it is an object of the present invention to provide an ink jet recording method, an ink jet recording device, an image processing method, a program, and a recording medium, for reducing ink fixing time as well as preventing the deterioration of images recorded by low permeability ink.

In order to achieve the above objects, according to a first aspect of the present invention, an ink jet recording method which records on a recording medium by respectively discharging a first ink and a second ink from first recording means and second recording means, based on image data, wherein the first ink has a predetermined permeability with respect to the recording medium and the second ink has a permeability higher than the predetermined permeability, comprises the steps of: deciding second provision conditions of the second ink for a predetermined region of the recording medium in which the first ink is to be provided based upon information on first provision conditions of the first ink for the predetermined region; and performing recording on the recording medium according to the first provision conditions of the first ink and the second provision conditions of the second ink decided in the deciding step.

Also, according to a second aspect of the present invention, an ink jet recording method for recording on a recording medium by respectively discharging a first ink and a second ink from first recording means and second recording means, based on image data, wherein the first ink has a predetermined permeability with respect to the recording medium and the second ink has a permeability higher than the predetermined permeability, comprises the steps of: acquiring information on first provision conditions of the first ink with respect to a predetermined region of the recording medium; judging a fixing state of the first ink on the recording medium following a predetermined time period based on the information acquired in the acquiring step; deciding second provision conditions of the second ink for the predetermined region of the recording medium to which the first ink is provided; and performing recording on the recording medium according to the first provision conditions of the first ink and the second provision conditions of the second ink decided in the deciding step.

Also, according to a third aspect of the present invention, an ink jet recording device for recording on a recording medium comprises: first recording means for discharging a first ink having a predetermined permeability with respect to the recording medium based on image data; second recording means for discharging a second ink having a permeability higher than the predetermined permeability based on image data; deciding means for deciding second provision conditions of the second ink for a predetermined region of the recording medium in which the first ink is to be provided based upon information on first provision conditions of the first ink for the predetermined region; and recording control means for performing recording on the recording medium according to the first provision conditions of the first ink and the second provision conditions of the second ink decided by the deciding means.

Also, according to a fourth aspect of the present invention, ink jet recording device for recording on a recording medium comprises: first recording means for discharging a first ink having a predetermined permeability with respect to the recording medium based on image data; second recording means for discharging a second ink having a permeability higher than the predetermined permeability based on image data; acquiring means for acquiring information on first provision conditions of the first ink with respect to a predetermined region of the recording medium; judging means for judging a fixing state of the first ink on the recording medium following a predetermined time period based on the information acquired by the acquiring means; deciding means for deciding second provision conditions of the second ink for the predetermined region of the recording medium to which the first ink is provided; and recording control means for performing recording on the recording medium according to the first provision conditions of the first ink and the second provision conditions of the second ink decided by the deciding means.

Also, according to a fifth aspect of the present invention, an image processing method for processing image data which is transported to an ink jet recording device for recording on a recording medium by respectively discharging a first ink and a second ink from first recording means and second recording means, based on image data, wherein the first ink has a predetermined permeability with respect to the recording medium and the second ink has a permeability higher than the predetermined permeability, comprises the steps of: deciding whether or not the second ink is to be provided in a predetermined region of the recording medium in which the first ink is to be provided based on discharge data of the first ink for the predetermined region; and creating discharge data for discharging the second ink in the predetermined region if it is decided to provide the second ink in the deciding step.

Also, according to a sixth aspect of the present invention, an image processing method for processing data used for performing an ink jet recording method for recording on a recording medium by respectively discharging a first ink and a second ink from first recording means and second recording means, based on image data, wherein the first ink has a predetermined permeability with respect to the recording medium and the second ink has a permeability higher than the predetermined permeability, comprises the steps of: deciding whether or not the second ink is to be provided in a predetermined region of the recording medium in which the first ink is to be provided based on discharge data of the first ink for the predetermined region; and creating discharge data for discharging the second ink in the predetermined region if it is decided to provide the second ink in the deciding step.

Also, according to a seventh aspect of the present invention, a computer-executable program for processing data used for performing an ink jet recording method for recording on a recording medium by respectively discharging a first ink and a second ink from first recording means and second recording means, based on image data, wherein the first ink has a predetermined permeability with respect to the recording medium and the second ink has a permeability higher than the predetermined permeability, comprises: code for deciding whether or not the second ink is to be provided in a predetermined region of the recording medium in which the first ink is to be provided based on discharge data of the first ink for the predetermined region; and code for creating discharge data for discharging the second ink in the predetermined region if it is decided to provide the second ink in the deciding step.

With the foregoing arrangement, in the event that a first ink having relatively low permeability (e.g., low permeability black ink) and a second ink having relatively high permeability (e.g., high permeability color ink) are used for recording, the provision conditions of the color ink for a designated region (how much ink is provided, if any) are determined corresponding to the provision conditions of the black ink for the above designated region (e.g., whether provided in high duty or low duty), the fixing time can be shortened as much as possible, as well as the amount of ink provided being controlled as much as possible. More specifically, high permeability color ink is provided to the regions in which the low permeability black ink is provided in high duty, i.e., the regions in which it takes a relatively long time for fixing of ink, so as to shorten the fixing time. On the other hand, the high permeability color ink is not provided to the regions in which the low permeability black ink is provided in low duty, i.e., the regions in which it takes a relatively short time for fixing of ink, so as to control the amount of provided ink as much as possible.

Further objects, features and advantages of the present invention will become apparent from the following description of the preferred embodiments (with reference to the attached drawings).

BRIEF DESCRIPTION OF THE DRAWINGS

FIGS. 15A and 15B are explanatory views which illustrate the manner in which fixing of each ink to the recording medium is carried out in the event that color dots are provided to black dots for recording, wherein FIG. 15A illustrates a case wherein color dots are under-printed, and FIG. 15B illustrates a case wherein color dots are upper-printed.

DESCRIPTION OF THE PREFERRED EMBODIMENTS

The preferred embodiments of the present invention will be described below.

With the embodiment, provision conditions (e.g., whether there is any provided, and if so, how much) of a high permeability second ink (e.g., color ink) are determined based upon information (e.g., dot density information or data amount) relating to provision conditions of a low permeability first ink (e.g., black ink) for recording mediums. Specifically, provision conditions of a low permeability black ink are judged quantitatively using ink dot density information, ink discharging data amount, or the like. When the fixing time of black ink is long (e.g., the dot density of black ink is high), an appropriate amount of color ink is coated onto the black ink for recording so as to shorten the fixing time. Also, in the event that the provided amount of black ink is small, e.g., the dot density of black ink is low or the like, over-recording of the color ink is not performed, with only black ink being recorded.

In this way, according to the present embodiment the fixing time is shortened and smearing is controlled by determining the provision conditions of color ink (how much ink is provided, if any, and so forth) corresponding to the provision conditions of the black ink.

Moreover, according to the embodiment, selection of the recording method and setting of the waiting time is performed as necessary. Furthermore, an arrangement is also proposed wherein reactive color ink and black ink are used.

The fundamental structure will be now described, which serves as a base for each embodiment (the first through third embodiments) with the ink jet recording device and the ink jet recording method according to the present invention.

Figure 1:
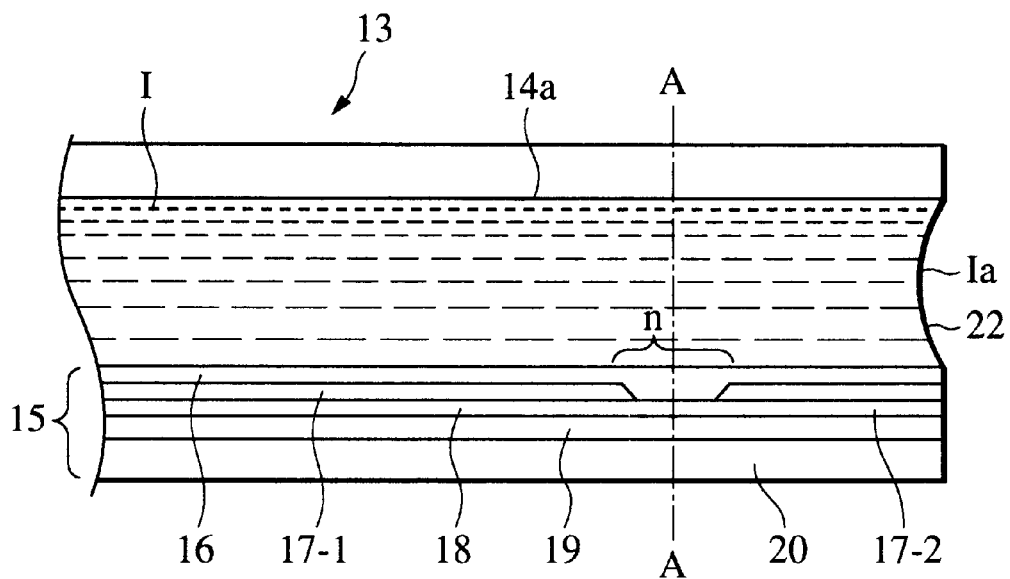
FIG. 1 is a vertical sectional view of a recording head, cut along an ink channel.
Figure 2:
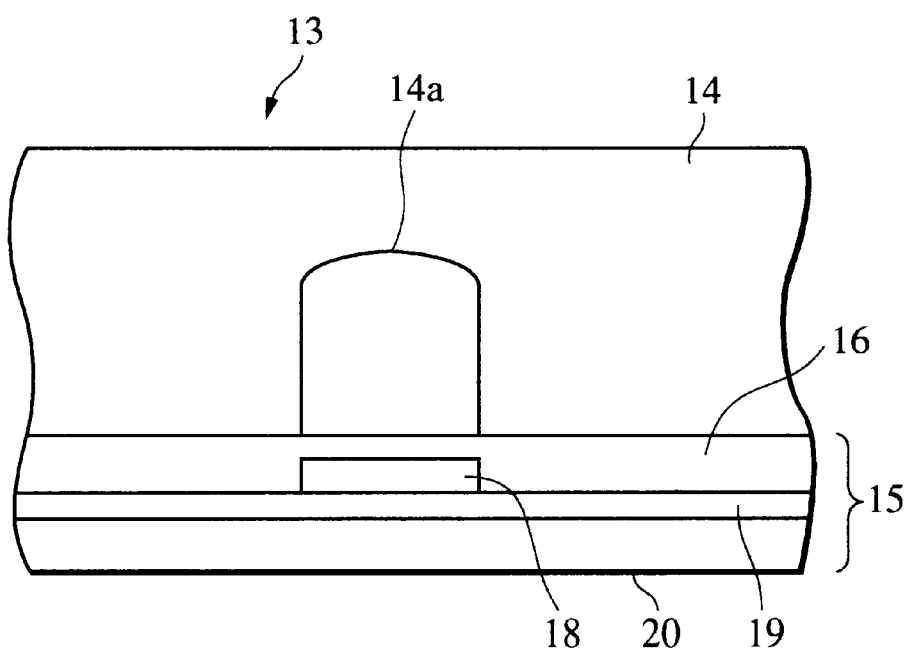
FIG. 2 is a sectional view along line A—A in FIG. 1.
Figure 3:
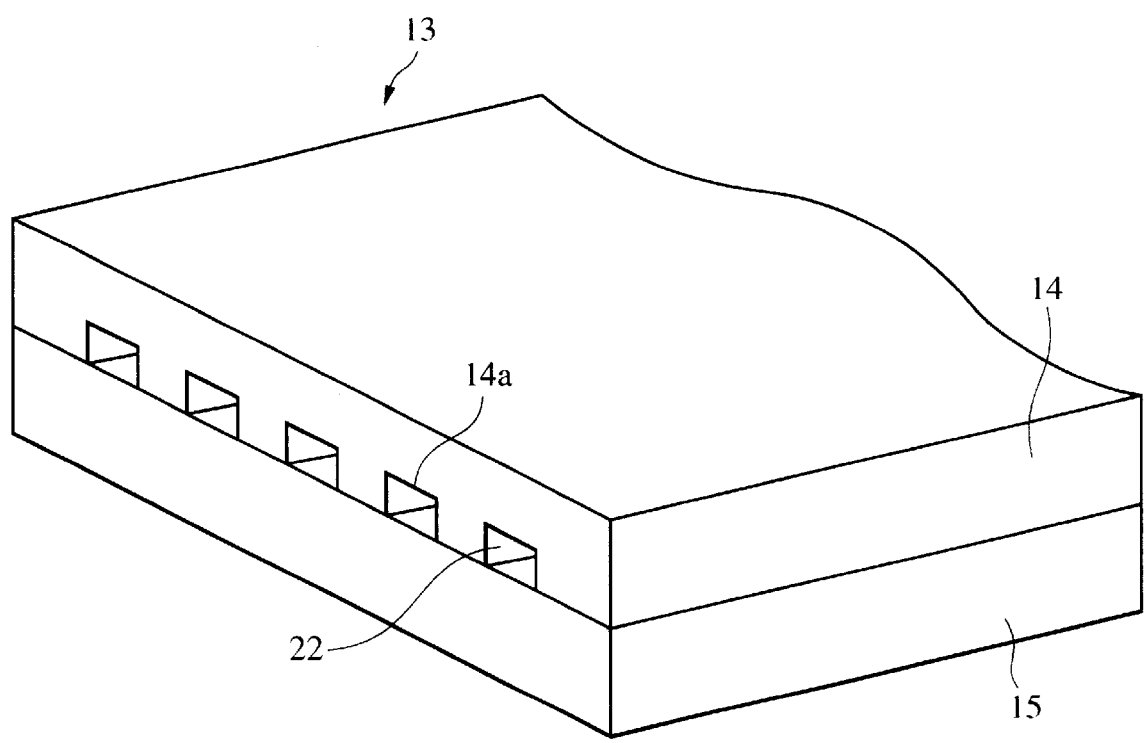
FIG. 3 is a external perspective view illustrating a schematic configuration of a recording head in which a great number of nozzles shown in FIG. 1 are arrayed.

The recording head (recording means) applied to each embodiment of the present invention may employ, for example, a method wherein recording signals are provided to recording ink in the recording head for discharging ink droplets by generating thermal energy. The structure of the recording head is illustrated in FIGS. 1 through 3. Note that FIG. 1 is a vertical sectional view of a recording head, being cut along an ink channel, FIG. 2 is a sectional view along line A—A in FIG. 1, and FIG. 3 is a schematic configuration of the recording head in FIG. 1 wherein a great number of nozzles are disposed.

In each drawing, reference numeral 13 denotes the recording head, which comprises a top plate 14 which is formed of glass, ceramic, plastic, or the like, with an ink channel 14a being formed thereupon, and a head body 15 having thermal resistors used for thermal recording, wherein the above units are bonded together. The head body 15 comprises a protective film 16 formed of silicon oxide or the like, aluminum electrodes 17-1 and 17-2, a thermal resistance layer 18 formed with nichrome or the like, a thermal storage layer 19, and a base 20 formed of a material with excellent thermal radiation properties, such as alumina or the like.

With the recording head as described above, recording ink I perpetually approaches a discharging orifice 22, and forms meniscus Ia due to pressure.

In the event that electric signals are applied to the electrodes 17-1, and 17-2, a region denoted by the reference character n of the recording head body 15 rapidly generates heat, and ink I adjacent to the area generates bubbles. The ink forming the meniscus Ia is discharged due to the pressure of the bubbles, and forms recording droplets which fly from the nozzle 22 toward a recording material.

Figure 4:
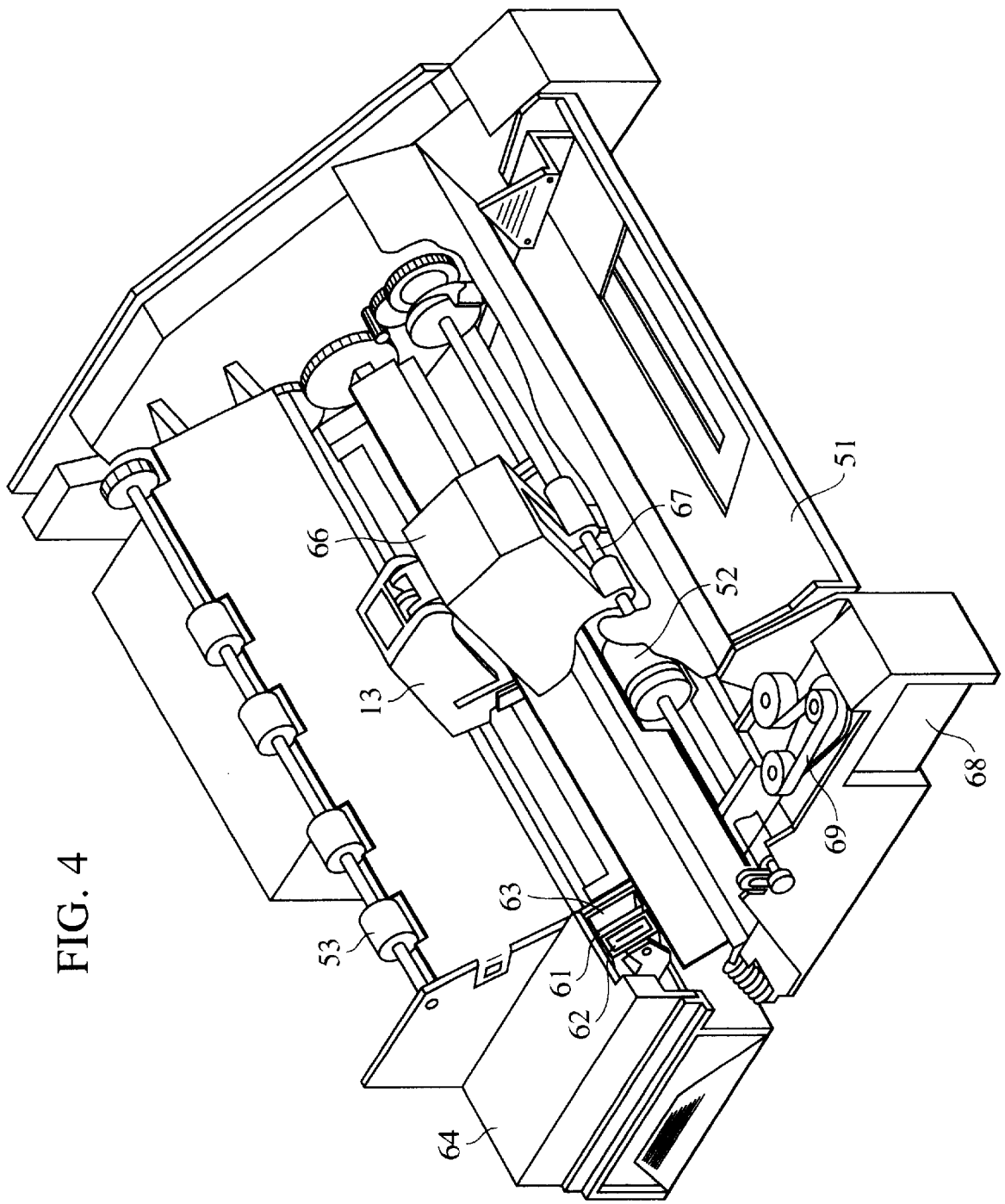
FIG. 4 is a perspective view illustrating an example of an ink jet recording device to which a recording head has been assembled.

FIG. 4 illustrates an example of an ink jet recording device including the recording head 13. In the drawing, reference numeral 64 denotes a recovery unit for performing recovery operations to maintain ink discharging conditions of each nozzle in an excellent state. The recovery unit 64 is arranged at a fixed recovery operating position (e.g., home position) or the like, removed from the recording area of the recording head, and comprises an ink absorber 63 for absorbing ink discharged from the recording head by pre-discharging, a blade 61 for cleaning the discharging outlet surface, a cap 62 for suctioning and discharging thickened ink within each nozzle of the recording head, and so forth.

Reference numeral 66 denotes a carriage which is supported by a guide shaft 67 or the like so as to move reciprocally along a main scan direction, which performs reciprocating motion with an endless belt 69 by the driving power of a carriage motor (CR motor) 68. The recording head 13, an ink tank which provides ink thereto, and so forth, are mounted in the carriage 66, and ink droplets are discharged from the recording head 13 with the movement of the carriage 66 as described above.

Reference numeral 51 denotes a recording medium supply unit for inserting recording media, and reference numeral 52 denotes a paper feed roller driven by a motor (not shown). With these configurations, the recording medium is transported to a position opposite the discharging outlet plane of the recording head, i.e., a recording position, and is discharged to a discharge unit having a paper discharging roller 53, as recording operations proceed. With the foregoing ink jet recording device, while the recording head is transferred reciprocally with the carriage along a main scan direction orthogonal to the transportation direction of the recording head, at least one of the black ink and color ink is discharged onto the recording medium for recording images in both going and returning directions. It should be noted that processing of recording data in reciprocal recording is realized by well-known art, so description thereof will be omitted.

At the time that the recording head is returned to the home position upon completion of the recording operations, the cap 62 of the head recovery unit 64 is retracted from the transfer pathway of the recording head and the blade projects into the transfer pathway. As a result, the discharging outlet surface of the recording head is wiped. Note that in the event that the cap performs capping with contact to the discharging outlet surface of the recording head, the cap is transferred so as to project into the transfer pathway of the recording head.

When the recording head is transferred from the home position to the recording start position, the cap and blade are in the same position as that in the wiping described above. As a result, the discharging output surface of the recording head is also wiped with this transfer.

The above wiping is also performed with the transfer of the recording head to the home position not only at the time of recording completion or discharging recovery, but also in the transfer of the recording head to the home position adjacent to the recording area at regular intervals while the recording head is being transferred in the recording area for recording.

Figure 5:
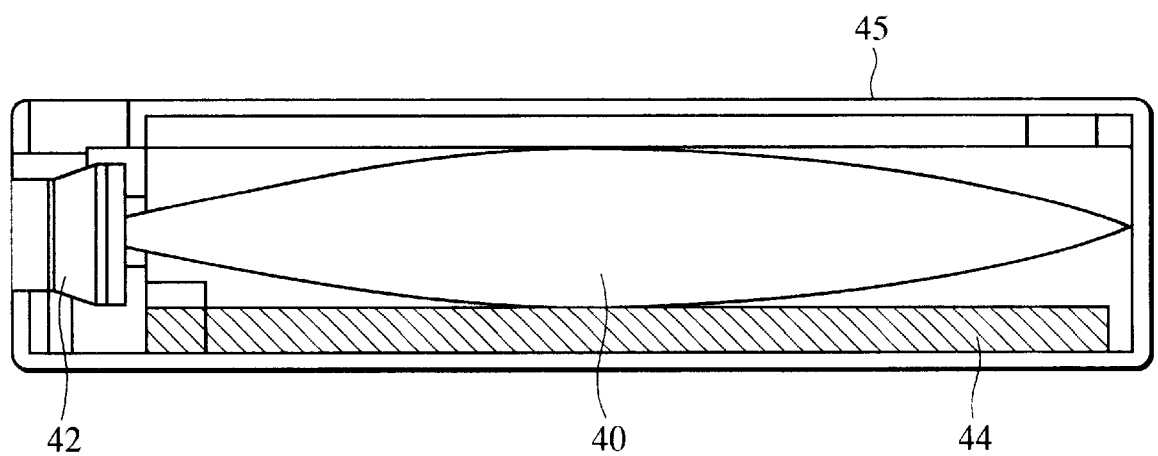
FIG. 5 is a vertical sectional view which illustrates an example of an ink cartridge which can be applied in the invention.

FIG. 5 indicates an example of an ink cartridge for providing ink to the recording head through an ink providing member such as a tube. In FIG. 5, reference numeral 40 denotes an ink storage unit for storing ink, which in this case, consists of an ink bag. A plug 42 made of rubber is provided at the tip of the ink bag 40, and ink in the ink bag may be provided to the head by inserting a needle (not shown) into the plug. Reference numeral 44 is an absorber for receiving waste ink. In the ink storage unit, an arrangement where the contact side with the ink is made of polyolefine is preferably used, and even more preferable polyethylene.

As for the cartridge capable of application to the present embodiment, an arrangement may be made wherein a cartridge has two storage units for storing black ink and color ink individually, and is configured so as to be detachably mounted to a plurality of heads for discharging the black and color ink.

Figure 6:
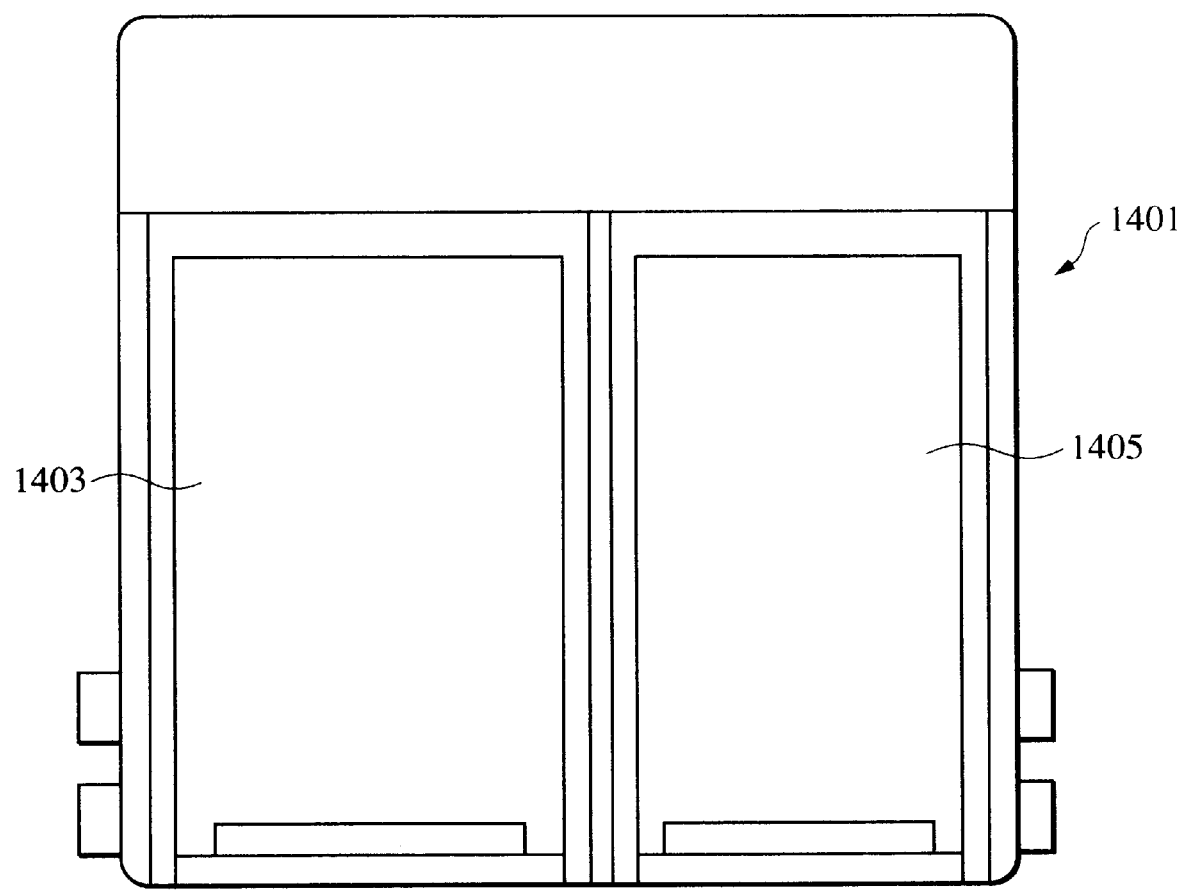
FIG. 6 is a schematic plan view which illustrates another example of an ink cartridge which can be applied in the invention.
Figure 7:
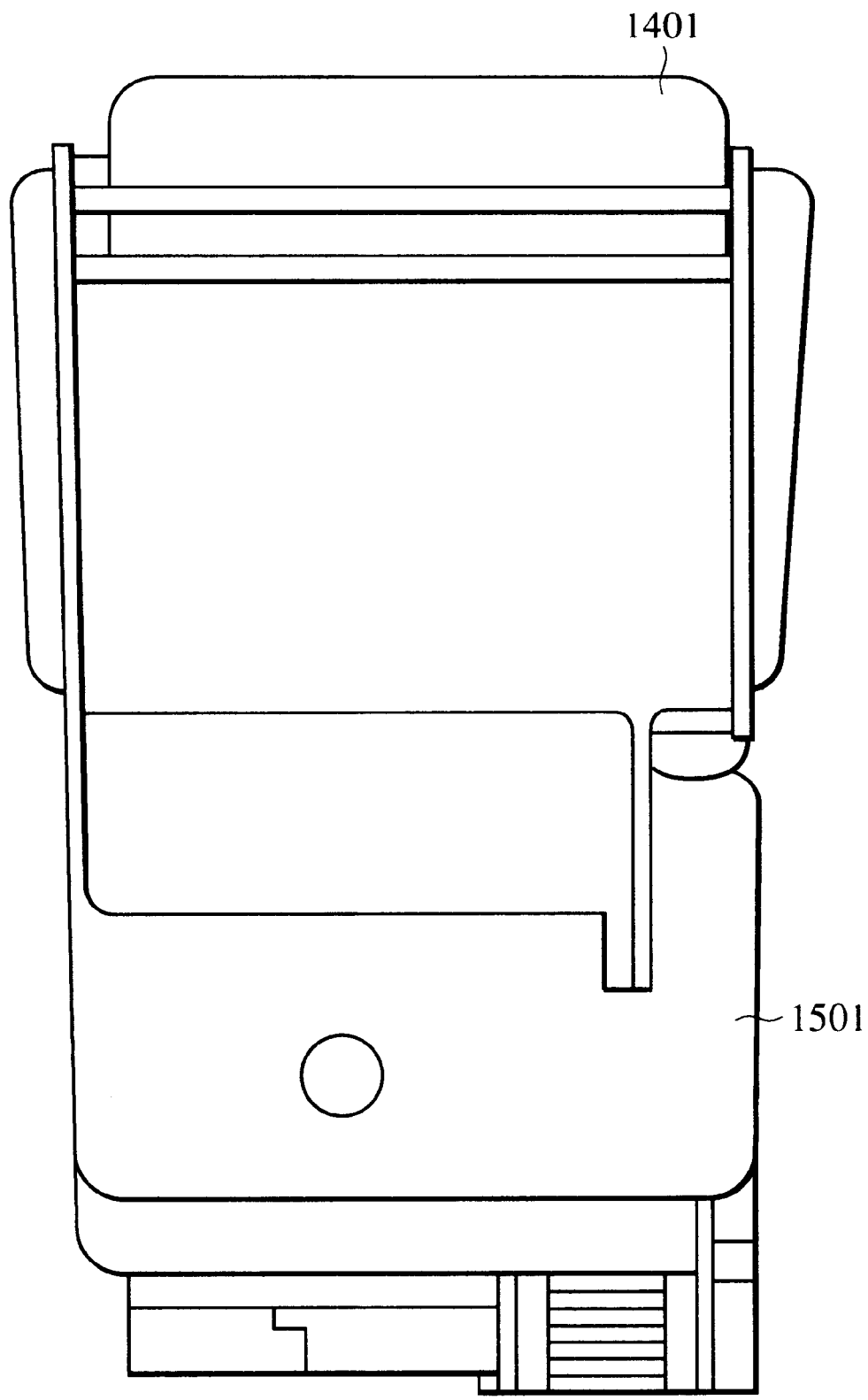
FIG. 7 is a schematic plan view which illustrates a state wherein the cartridge shown in FIG. 6 is mounted on the recording head.

FIG. 6 indicates an example of such a cartridge 1401, wherein reference numeral 1403 indicates a black ink storage unit and reference numeral 1405 indicates a color ink storage unit. The cartridge 1401 is configured so as to be detachably mounted to the recording head 1501 for discharging both black ink and color ink as shown in FIG. 7, as well as ink being provided to the recording head 1501 in the state of the cartridge 1401 being mounted to the recording head 1501.

Recording heads and ink cartridges capable of being applied to the ink jet recording device according to the present embodiment are not restricted to only arrangements wherein the recording head and ink cartridge are separable, rather, arrangements wherein the units are formed integrally are also suitably used.

Figure 8:
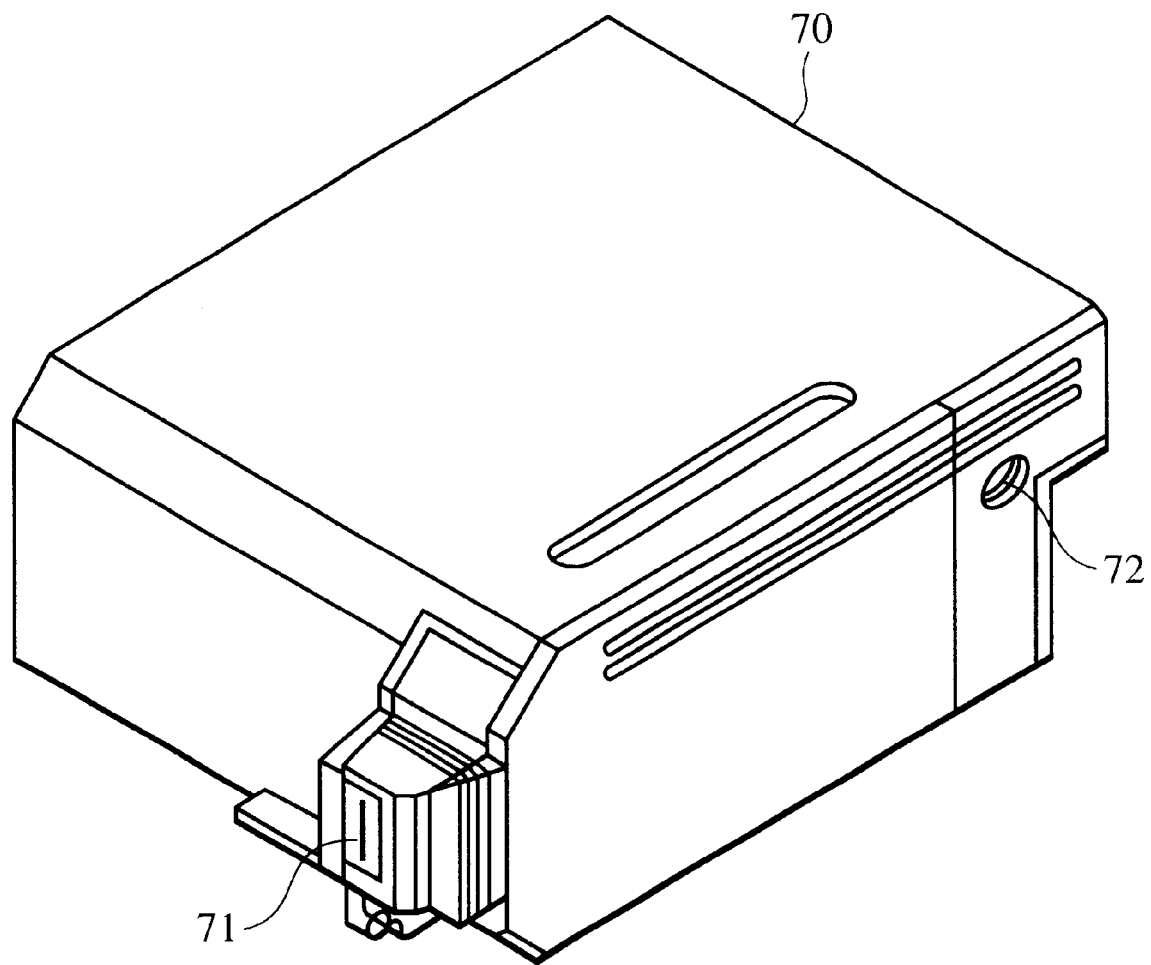
FIG. 8 is a schematic perspective view of a recording unit which can be applied to the embodiment of the present invention.

In FIG. 8, reference numeral 70 denotes a recording unit comprising an ink storage unit for storing ink, e.g., an ink absorber or the like, from which the ink is discharged as ink droplets from a head unit 71 having multiple orifices. As the material of the ink absorber, polyurethane may be employed, for example. Reference numeral 72 denotes an air communication aperture for communication of the interior of the recording unit with the atmosphere. The recording unit is an alternative to that shown in FIG. 4, which is configured so as to be detachably mounted to the carriage 66.

As another arrangement of the recording unit capable of being applied to the embodiment, a recording unit may be presented which comprises a single ink tank divided into ink storage units separately for storing black ink and color ink (e.g., at least one color ink selected from yellow, magenta, cyan, red, green, and blue) corresponding to each color, and a recording head for discharging each ink, in an integrated manner.

Figure 9:
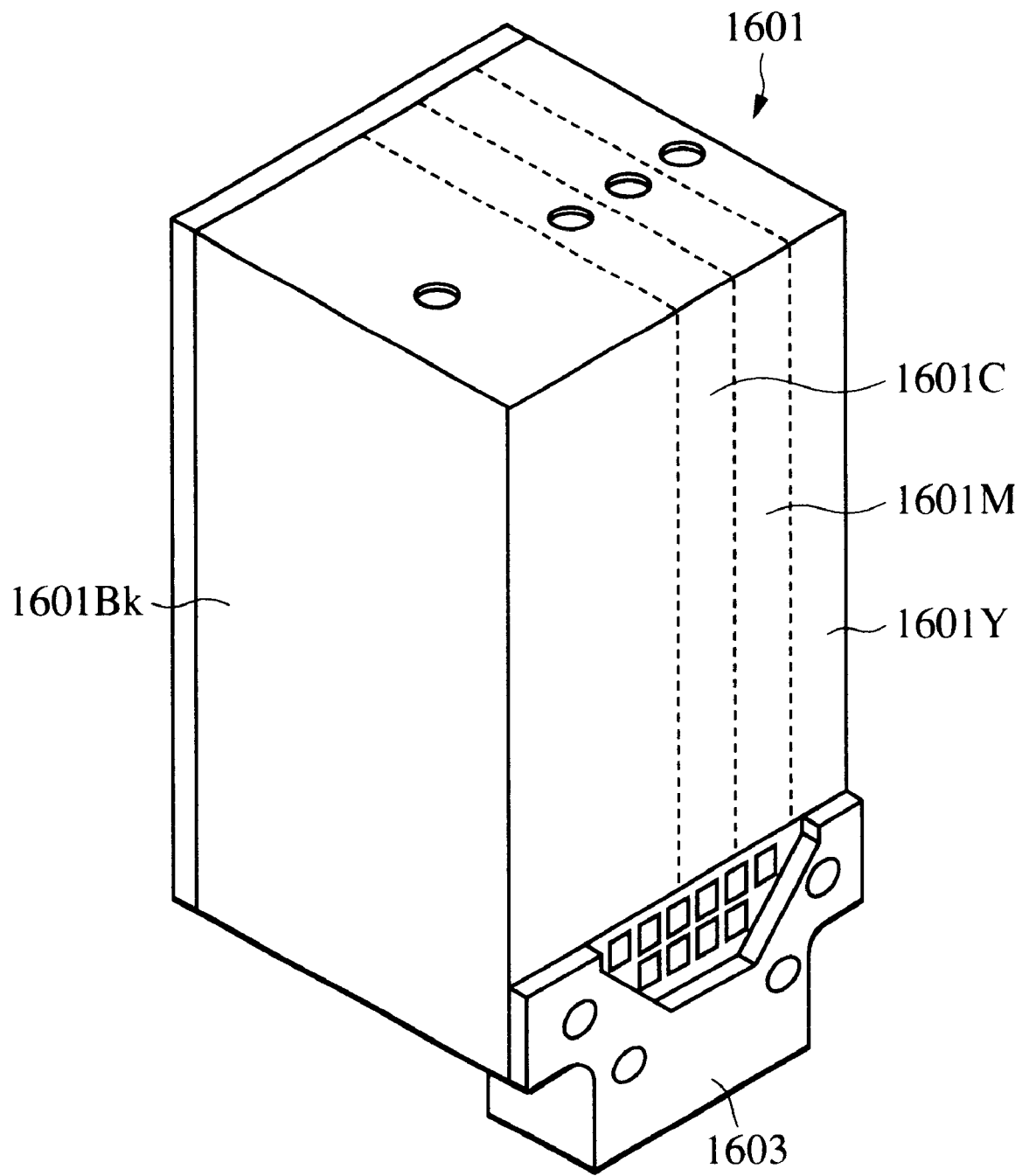
FIG. 9 is a schematic perspective view of another recording unit which can be applied to the embodiment of the present invention.

FIG. 9 indicates an example of the recording unit. As shown in the drawing, the recording unit comprises a storage unit 1601Bk for storing black ink, and color ink storage units 1601Y, 1601C and 1601M for storing color ink of yellow, cyan, and magenta, respectively, as well as a recording head 1603 configured to separate the ink channels for discharging each ink individually.

Also, with the ink jet recording device applied to the present embodiment, while an ink jet recording device is described above by way of an example wherein thermal energy is applied to the ink for discharging the ink, an arrangement may be also applied which employs a method wherein mechanical energy is applied to the ink for discharging the ink, for example, the piezo-electric method employing piezo-electric devices.

Figure 10:
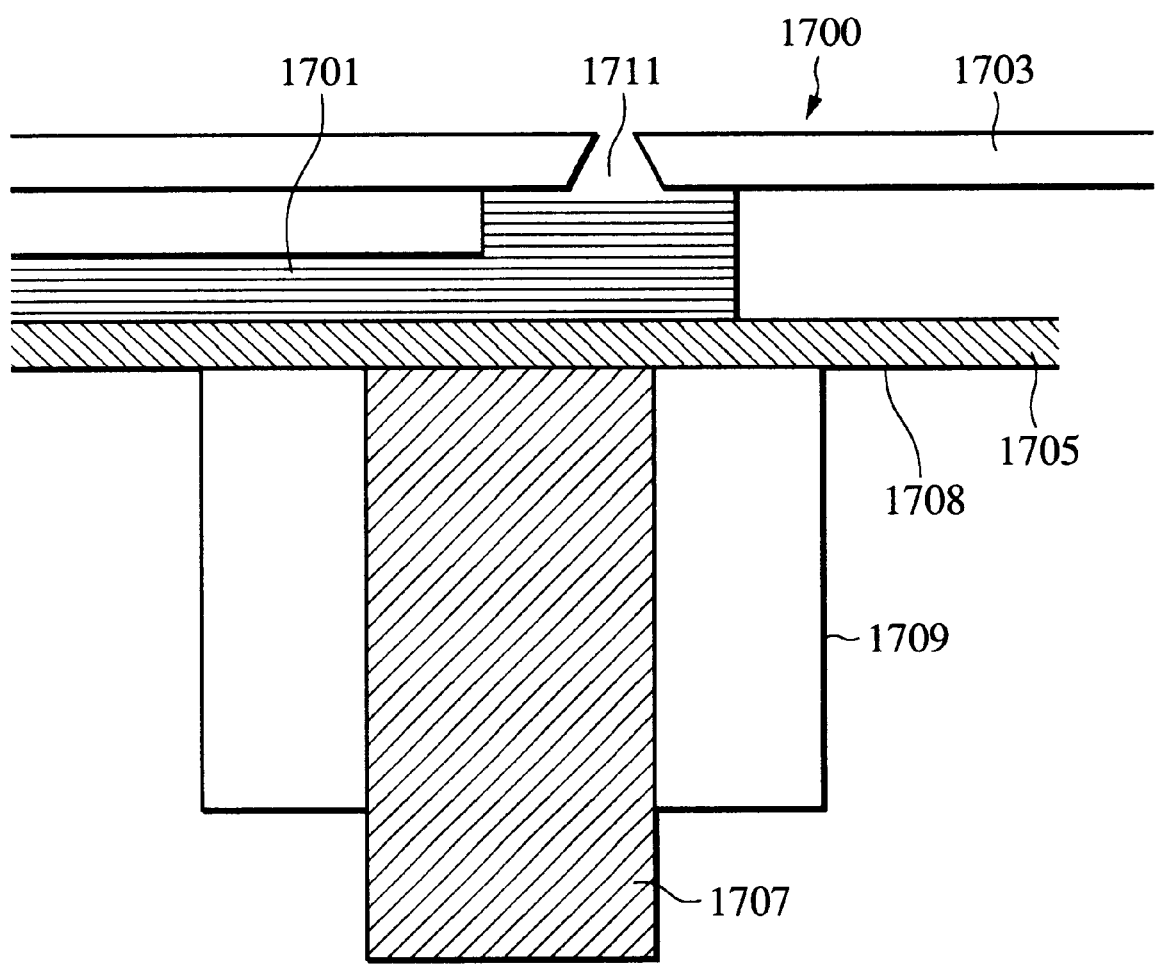
FIG. 10 is an enlarged vertical sectional side view which illustrates the orifice unit of another recording head which can be applied to the embodiment of the present invention.

FIG. 10 illustrates a sample configuration of the recording head for discharging ink units by using mechanical energy.

A recording head 1700 illustrated here comprises an ink channel 1701 communicating with an ink chamber (not shown), an orifice plate 1703 for discharging ink droplets of a desired volume, an oscillating plate 1705 for directly applying pressure to the ink, a piezo-electric device 707 which is connected to the oscillating plate 1705 and is distorted by electric signals, a base 1709 for fixing the orifice plate 1703, an oscillating plate, and so forth.

Here, the ink channel 1701 is formed with photosensitive resin or the like, and the orifice plate 1703 is formed with a metal member such as stainless steel, nickel, or the like, having a discharging aperture 1711 opened by a process such as electro-forming, press working, or the like. An oscillating plate 1705 is formed with metal film such as steel, nickel, titanium, and high elasticity resin and so forth, and a piezo-electric device 1707 is formed with dielectric substance such as barium titanate, PZT, or the like.

The recording head configured as described above performs operations wherein a pulse-like voltage is applied to the piezo-electric device 1707 so as to generate distortion stress whereby the stress generating energy distorts the oscillating plate connected to the piezo-electric device 1707, so the ink within the ink flow pathway 1701 is compressed in a direction orthogonal thereto, and thereby ink droplets (not shown) are discharged from the discharging aperture 1711 for recording. Such a recording head may be employed by being assembled into a recording device similar to that shown in FIG. 4. The operations of the recording device are generally the same as those described above.

Figure 17:
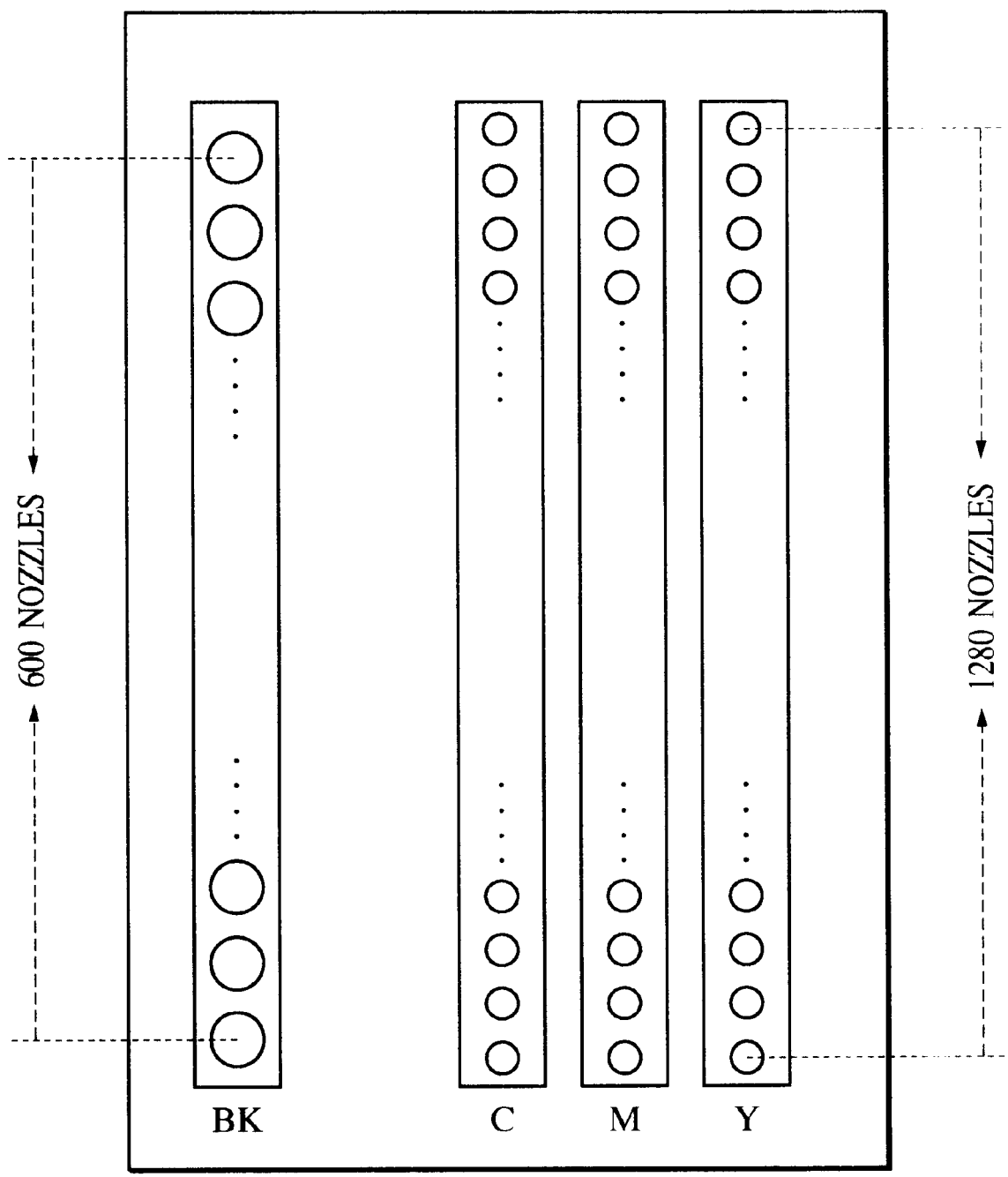
FIG. 17 is an explanatory diagram which illustrates an array of nozzles of the recording head.

FIG. 17 illustrates a nozzle configuration of the recording head employed in the present embodiment. The head for discharging black ink (first recording means) has 600 nozzles with the spacing of 1/600 inch. On the other hand, the color head (second recording means) has 1200 nozzles with the spacing of 1/1200 inch. As described above, the color head has a higher nozzle resolution than the black head so as to realize high resolution and highly-detailed images.

Figure 11:
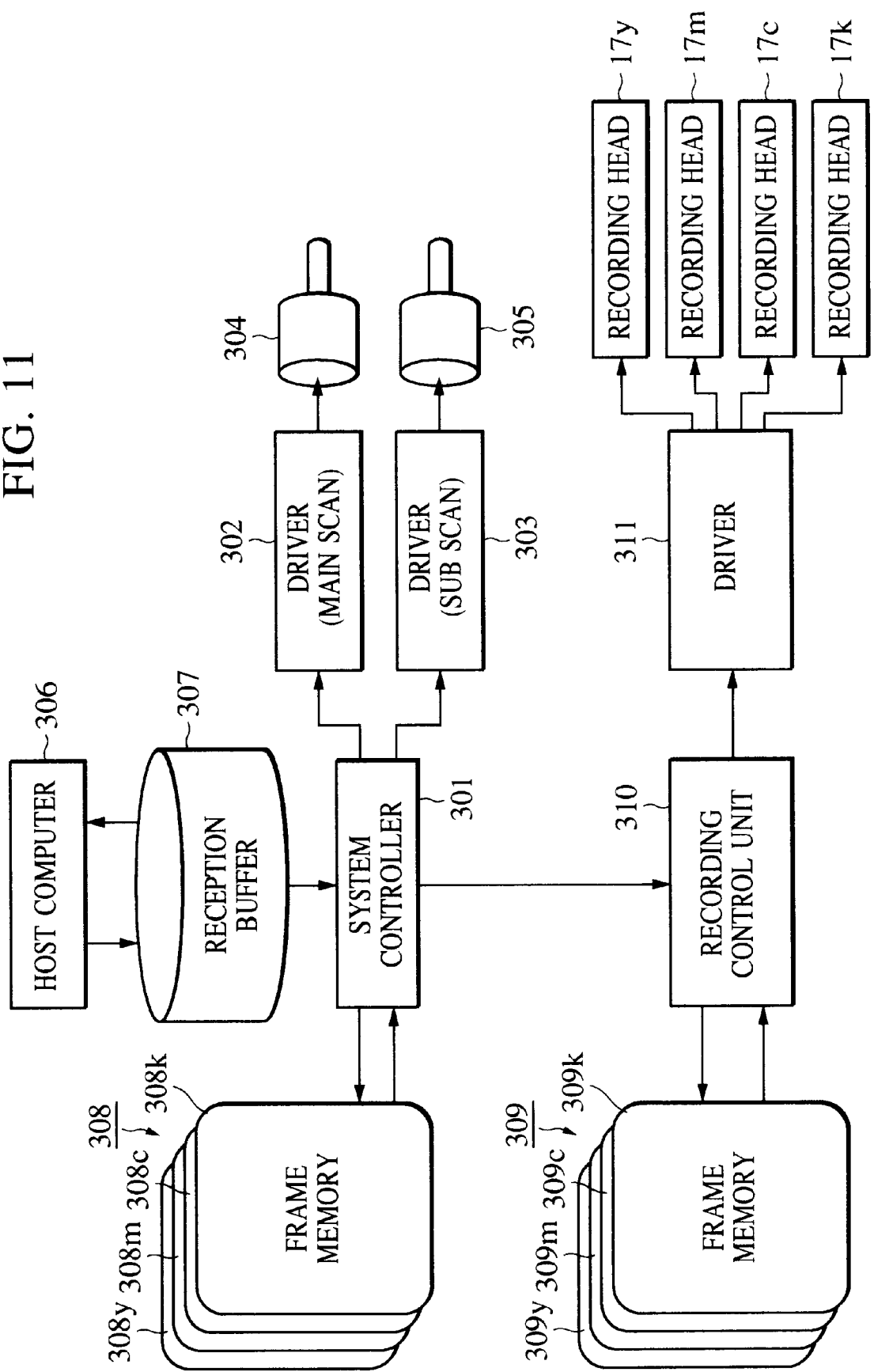
FIG. 11 is a block diagram which indicates a configuration of the control system of the present invention.

Also, FIG. 11 illustrates a block diagram of an electric control system, which indicates a configuration example of the electric control system of the ink jet recording device shown in FIG. 4.

In the drawing, reference numeral 301 denotes a system controller for controlling the overall device, in the interior of which a microprocessor, a memory device (ROM) where for storing control programs, and so forth are disposed. Reference numeral 302 denotes a driver for driving the recording head in the main scan direction. Reference numeral 303 denotes a driver for transporting the recording paper in the sub-scan direction. Reference numerals 304 and 305 indicate motors corresponding to drivers 302 and 303 respectively, each operating by receiving information such as speed, transfer distance, and so forth from the corresponding driver.

Reference numeral 306 indicates a host computer which is a device for transporting information to be recorded by the ink jet recording device according to the present embodiment. The device may be arranged so as to employ the computer as an information processing device, or as an image reader. Reference numeral 307 denotes a buffer for temporarily storing data from the host computer 306, which stores received data until the data is read out by the system controller 301. Reference numeral 308 (308*k*, 308*c*, 308*m*, 308*y*) denotes frame memory for rendering data to be recorded as image data, with a memory size necessary for recording every color. While the frame memory capable of storing data for one sheet of one recording paper is described here, it is needless to mention that the present invention is not limited with regard to the size of the frame memory. Reference numeral 309 (309*k*, 309*c*, 309*m*, 309*y*) denotes a memory device where memory capacity is temporarily altered according to the number of nozzles of the recording head.

Reference numeral 310 denotes a unit for appropriately controlling the recording head by commands from the system controller 301, which functions as a recording control unit (control means) for controlling the recording speed, recording data amount, and so forth, as well as functioning as processing means for recording data, and judging means for performing judging operations. Reference numeral 311 denotes a driver for driving recording heads 17*k*, 17*c*, 17*m*, and 17*y* for discharging ink, which is controlled by signals from the recording control unit.

With the control system having the above arrangement, image data provided from the host computer 306 is transported to the receiving buffer 307 wherein the image data is temporarily stored, and rendered to frame memory for each color. The rendered image data is then read out by the system controller 301 and rendered to the buffer 309. The recording control unit 310 controls operations of the recording heads 17*k*, 17*c*, 17*m*, and 17*y* based upon the image data within each buffer, and processing fluid.

Features of the embodiments according to the present invention will be described below.

First Embodiment

The fixing time, recording method, and so forth according to the first embodiment will now be described in detail.

Figure 12A:
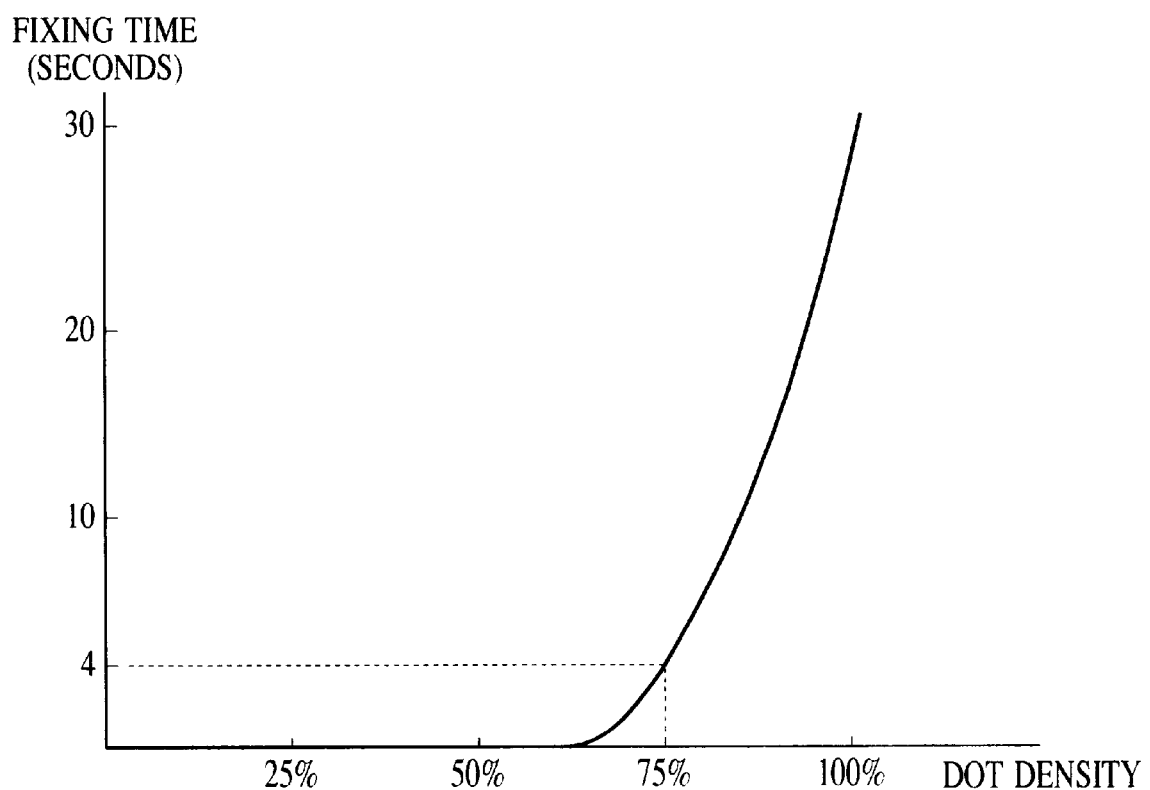
FIG. 12A is a diagram which represents the relationship between the fixing time and dot density according to the present invention.

Fixing Time:

FIG. 12A depicts the relationship between the dot density of an image comprising a region of 64 pixels by 64 pixels recorded with black ink, where an area of 1/600 inch by 1/600 inch is equal to 1 pixel, and the time required for fixing the image (fixing time). Note that in all cases below, a pixel is understood to be 1/600 inch by 1/600 inch.

Figure 12B:
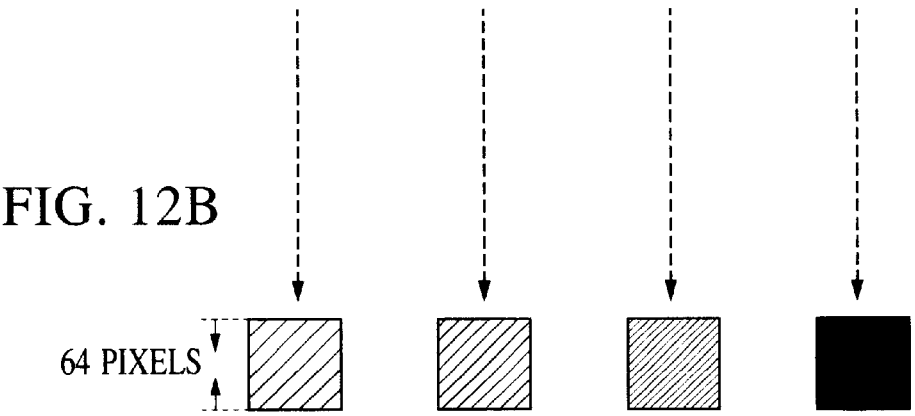
FIG. 12B is an explanatory diagram which illustrates images which are formed with different dot densities.

FIG. 12B indicates images in which ink is provided at different dot densities. In the figure, the image located to the far right is an image wherein ink has been provided at a dot density of 100% (thinning rate 0%). The provision amount of dot density of 100% means a provision amount wherein ink droplets of 30 ng are provided to all pixels as one dot. In this case, the dots are assumed to be distributed throughout the region of 64 pixels by 64 pixels almost uniformly. The time required for fixing means the time required from the point that recording of the preceding paper is completed to a point where the subsequent paper will not be soiled thereby. Therefore, for example, with a printer which requires a printing rate of 15 sheets per minute, the fixing time should be within about 4 seconds. As indicated clearly in FIGS. 12A–12B, as the dot density is raised, the required fixing time increases.

Figure 13A:
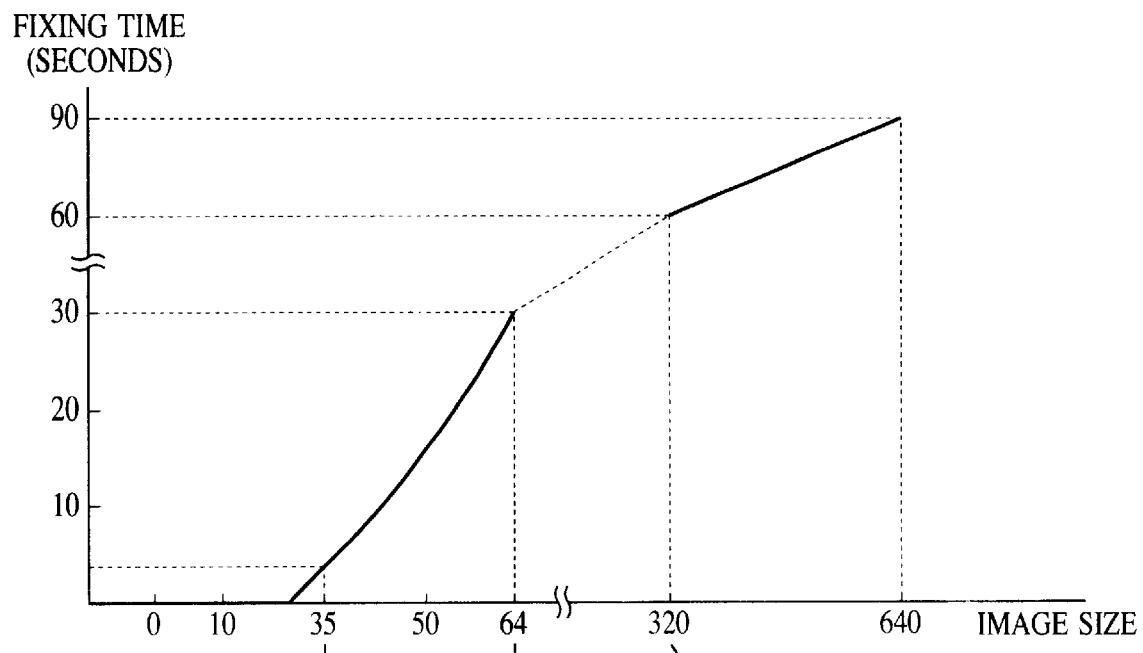
FIG. 13A is a diagram which represents the relationship between the fixing time and image size according to the embodiment of the present invention.

Next, FIG. 13A illustrates the change in fixing time when the image region is widened with the dot density remaining fixed at 100%. Here, a square region with the same number of pixels for width and height is recorded with a dot density of 100%. The horizontal axis in the drawing indicates the length of one side of each image in increments of pixels.

Figure 13B:
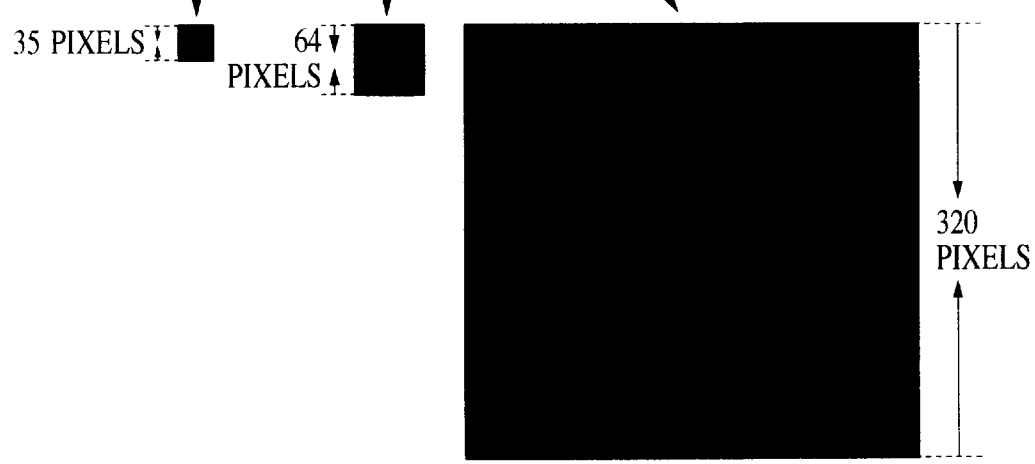
FIG. 13B depicts images of different sizes recorded at a dot density of 100%, and it can be understood from the figure that a longer fixing time is required as the size of the region increases.

FIG. 13B depicts images of different sizes recorded at a dot density of 100%, and it can be understood from the figure that a longer fixing time is required as the size of the region increases.

Figure 14A:
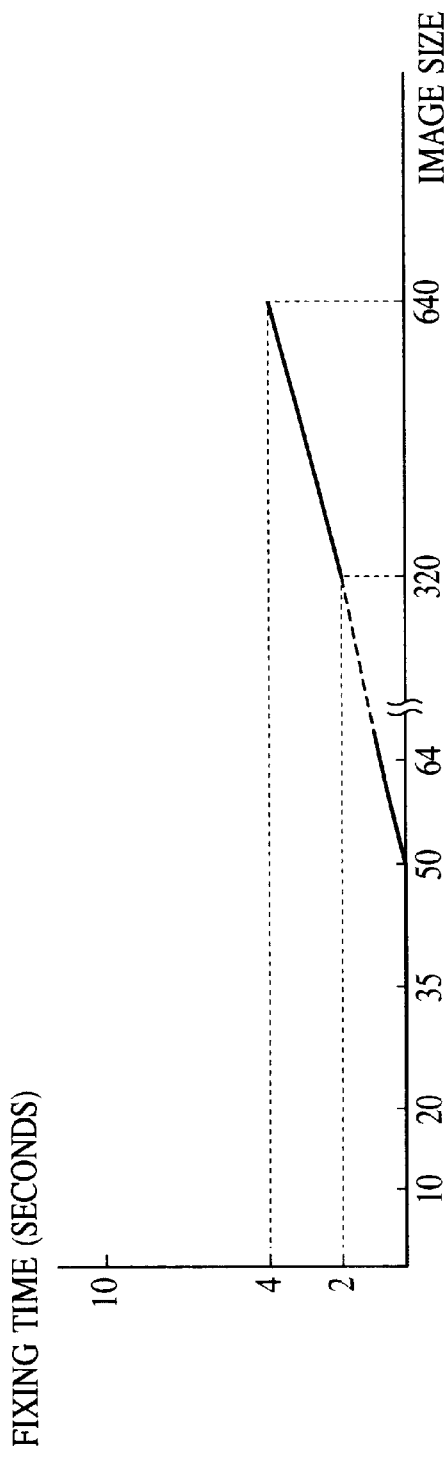
FIGS. 14A and 14B are diagrams which represent the relationship between the fixing time and image size in the event that color dots are provided to black dots, wherein FIG. 14A indicates a case in which color dots are under-printed, and FIG. 14B indicates a case wherein color dots are upper-printed.

Next, FIG. 14A indicates the fixing time of black ink when color ink is provided to a square region as indicated in FIGS. 13A and 13B beforehand (this recording method of color ink will hereafter be referred to as "under-printing"), and subsequently, black ink is coated onto the same region. The color ink is provided in the example at a dot density of 25% (thinning rate 75%), wherein dot density of 100% (thinning rate 0%) is a state in which ink droplets of 4.5 ng of cyan, magenta, or yellow ink are provided to a square region 1/600 inch square.

Figure 14B:
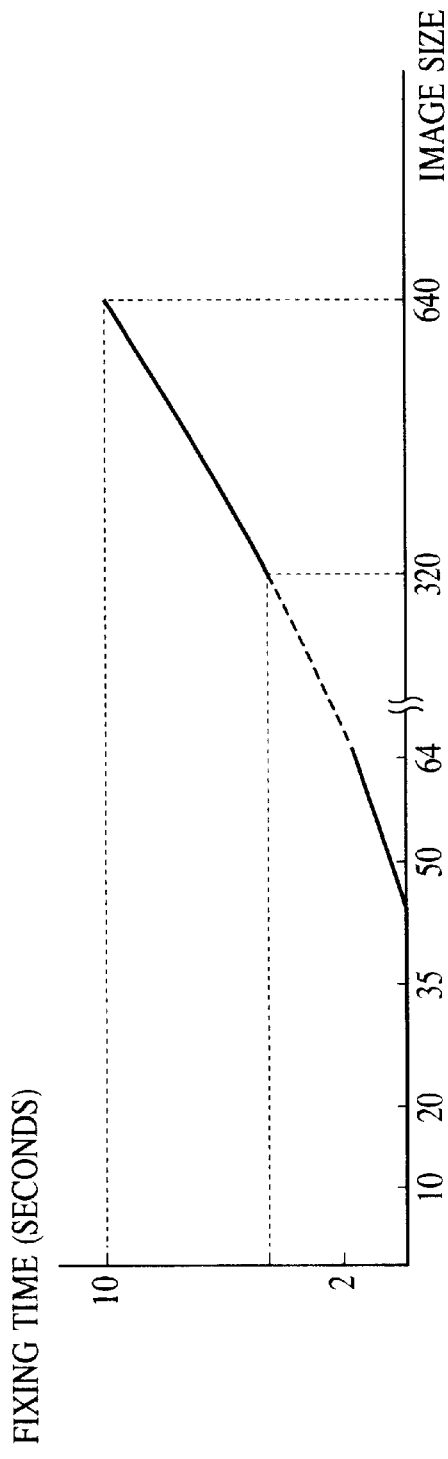

FIG. 14B indicates the fixing time of black ink when color ink is provided following the provision of black ink (this recording method of color ink will hereafter be referred to as "over provision") to a region such as indicated in FIGS. 13A and 13B. In this case, as will be clearly understood by comparing with FIG. 13A the fixing time is shortened by the provision of color ink. Moreover, comparing FIGS. 14A and 14B makes it clear that the method wherein color ink is recorded before the black ink shortens the fixing time even more.

FIGS. 15A and 15B illustrate a conceivable mechanism of ink fixing with regard to this phenomena. In the event that color ink is provided onto the recording paper surface beforehand as depicted in FIG. 15A, color ink 2001 wets the surface of the recording paper to a sufficient extent due to the high permeability thereof, and raises the wettability of the paper surface. Next, the black ink 2002 is provided to the large area with high wettability, where the black ink 2002 expands, permeates, and is fixed in a short period of time.

On the other hand, in the event that the black ink 2002 is provided to the recording medium beforehand, as depicted in FIG. 15B, the low permeability black ink 2002 initially comes in contact with the paper surface, and a low permeability interface is formed between the recording medium and the black ink 2002. It has been understood that in the event that the color ink 2001 is provided under such conditions, the color ink 2001 is mixed with the black ink 2002 on the paper surface, following which the high permeability mixed ink 2003 infiltrates the paper. However, it has also been understood that since the provision amount of the color ink 2001 is usually smaller than that of the black ink 2002, even if both inks are fully mixed, the permeability of the black ink 2002 is not markedly raised. Therefore, the black ink does not infiltrate easily and the fixing time thereof is longer than with the method wherein the color ink is provided beforehand. As can be understood clearly from the above description, while the configuration wherein the high permeability color ink is provided following the provision of the low permeability black ink leads to a fixing time somewhat longer than with the configuration wherein the color ink is provided before the provision of the black ink, the fixing time is considerably shorter than with the configuration wherein the high permeability color ink is not provided to the low permeability black ink.

Figure 16:
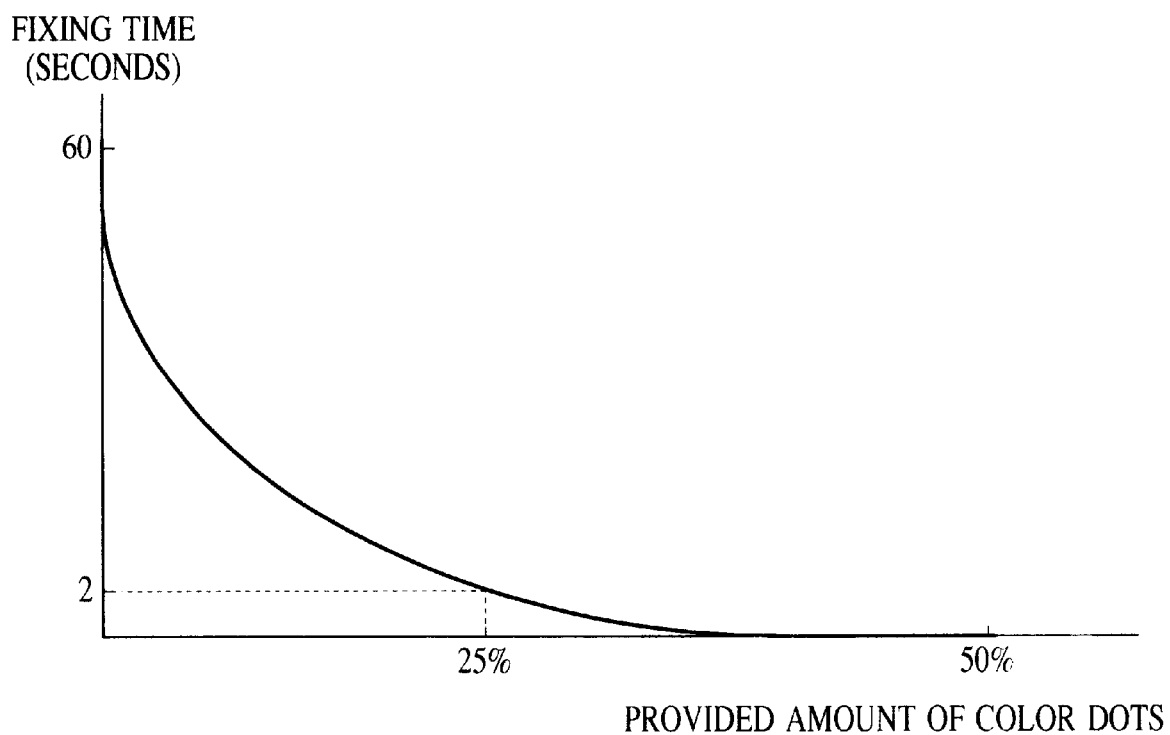
FIG. 16 is a diagram which represents the relationship between the amount of color dots provided and the fixing time.

FIG. 16 depicts the relationship between the provision amount of color ink and the fixing time. The relationship in an arrangement wherein black ink is provided to a 320 by 320 pixel region at a dot density of 100%, and the amount of under-printing color ink is increased for the black image formed on the above region, is indicated here. It can be understood that as the provided amount of the color ink is increased, the fixing time of the black ink is shortened.

The relationship between the provided amount of color ink and the quality of black characters recorded by the black ink will now be described. The relationship between the provided amount of color ink and the deterioration level of the black character quality was measured, and the results are summarized in Table 1. As indicated in the table, as the amount of color ink provided is increased, the black character quality (sharpness) deteriorates.

TABLE 1

Amount of color ink provided, and condition of black characters

| Amount of color ink provided | 0% | 10% *3 | 15% *3 | 25% *3 | 35% *3 | 45% *3 |
|---|---|---|---|---|---|---|
| Condition of black characters | A | A' | A' | A' | B | C |

A Deterioration not noticeable.
A' Deterioration hardly noticeable.
B Deterioration somewhat noticeable.
C Deterioration noticeable.

The relationship between the provision conditions of each ink and the fixing time of the black ink (Bk ink) and the recording quality, described above, is summarized as follows.
(1) The fixing time of the Bk ink increases as the dot density thereof is increased.
(2) The fixing time of the Bk ink increases as the area where the Bk ink is provided increases.
(3) The fixing time of the Bk ink is shortened by providing the color ink, and is further shortened by providing the color ink before the Bk ink.
(4) The fixing time of the Bk ink is shortened as the provided amount of the color ink is increased.
(5) The black character quality deteriorates as the provided amount of color ink is increased.

Recording Method:

The recording method according to the first embodiment will now be described in detail.

The ink jet recording device applied in this embodiment is assumed to be capable of recording 15 sheets or more per minute, of images which are recorded with the low-permeability black ink (hereafter referred to as "black ink images").

In this embodiment, an arrangement is made wherein index information representing provision conditions of black ink is acquired as information regarding quantified provision conditions of black ink, which is the low permeability ink (first ink) for the recording paper, and the fixing state (fixing time) is judged based upon the index information. Then the provision of the color ink, which is the high permeability ink (second ink), is controlled based upon the judgment results.

The index for judging the fixing state of a black image is obtained by calculating the dot density of the black ink for a detection area of 64 pixels square (called a small detection area below). As indicated in FIGS. 12A–12B, in the event that the dot density is 75% or more, the fixing time comes to exceed 4 seconds. Therefore, the double recording with color dots must be performed for regions where the dot density is 75% or more.

Let us now consider a case of irregular distribution of the dot density in a 64 by 64 pixel region. For example, as indicated in FIGS. 13A–13B, in the event that an image is formed in a 35 by 35 pixel region with a dot density of 100%, the fixing time of the 64 by 64 pixel region including the 35 by 35 pixel region exceeds 4 seconds due to the presence of this region. Specifically, in this case, the dot density in the small detection region of 64 pixels square is about 30%, so the fixing time should be far less than 4 seconds based upon the relationship shown in FIGS. 12A–12B. But as indicated in the relationship in FIGS. 13A–13B, the actual fixing time exceeds 4 seconds.

Therefore, with the present embodiment, when the dot density as an index indicating the ink provision state in a small region is not 75% as described above, but is 30% or more, over-recording with color dots is performed for the small region, thereby preventing smearing.

Also, with the present embodiment, in the event of over-recording of black ink and color ink, the recording of color ink precedes that of black ink.

Next, judging of the provided amount of color ink in the under-printing will be described. It is desirable that the provided amount of color dots for under-printing high permeability color ink is raised as much as possible in view of the fixing of black ink, as indicated in FIG. 16. However, as already described with respect to Table 1, in the event that the provided amount is too large, the character quality deteriorates. Since the deterioration of the character quality should be prevented as much as possible, it is not wise to increase the provided amount of color ink more than is necessary. Therefore, with the present embodiment, the dot density of color ink is set to be 25%, based upon the above Table 1, for every color.

Moreover, even if color dots are under-printed, in the event that the region of black images is large, the ink may adhere to the back of next recording medium. As shown in FIGS. 13A–13B, with the amount of color under-printing at 25%, when the width of the black ink region is 640 pixels or more, the fixing time exceeds 4 seconds. In such cases, discharge paper waiting control wherein discharging to the discharging unit is temporarily stopped at the point of completion of recording of the subsequent recording paper, as well as the under-printing, are performed.

Figure 18:
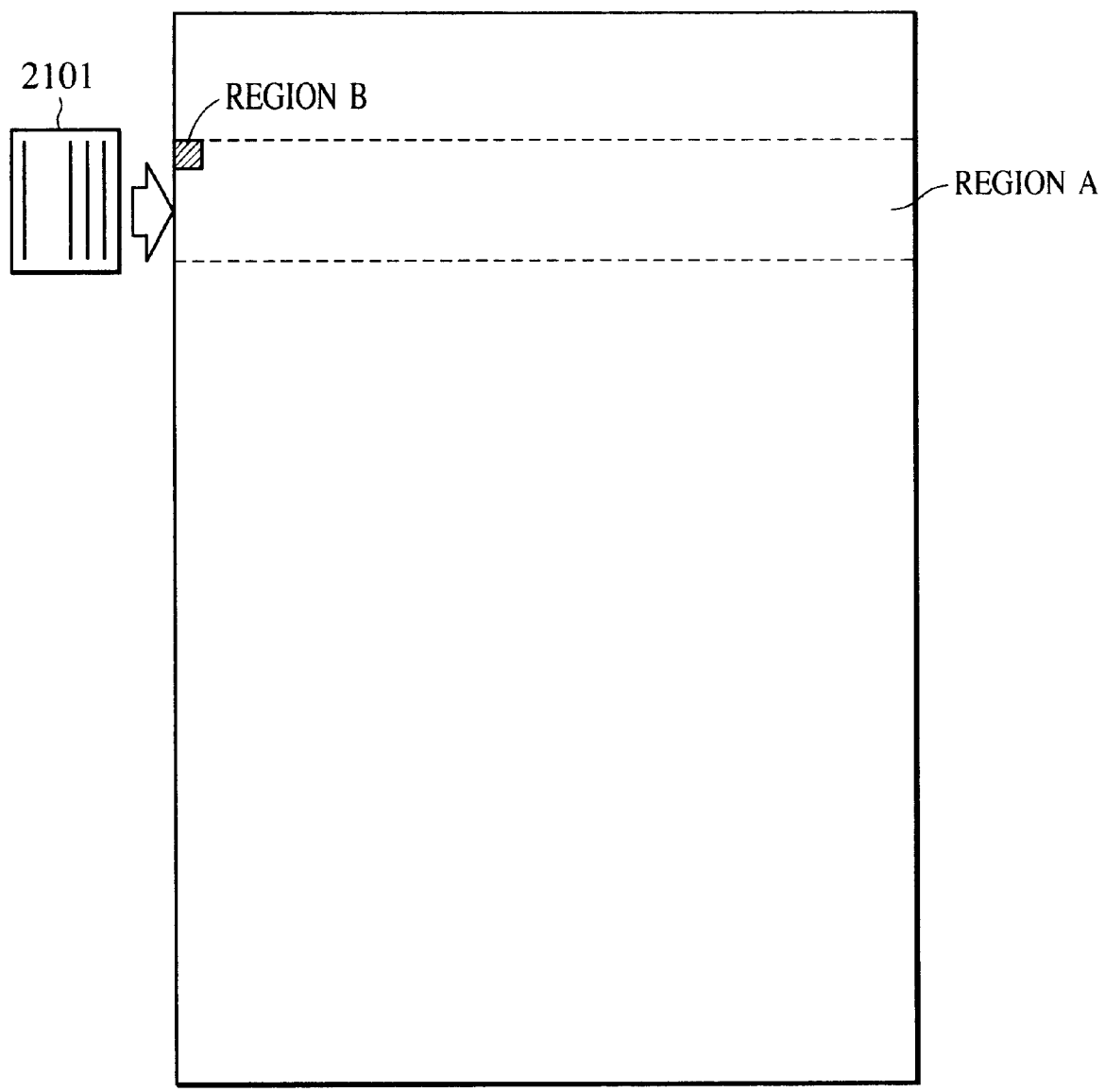
FIG. 18 is an explanatory plan view which illustrates a detection region and a small detection region.

FIG. 18 specifically illustrates a detection region, a small detection region, and a detection method, employed by the ink jet recording device according to the present embodiment.

The recording head employed in the present embodiment has 600 nozzles for discharging black ink as illustrated in FIG. 17. Therefore, the region which can be recorded at one time is 600 nozzles wide in the vertical direction, as indicated by the region A in FIG. 18.

With the present embodiment, at the time of printing text with black ink, one-pass recording wherein one main scan completely forms an image with the same length as that of the nozzle array of the head is performed in a two-way manner by a reciprocating motion of the carriage which performs so-called two-way recording. In this case, the detection region is the region A in which recording is performed at one time. Actual detection is performed by calculating the dot density of black ink for every 64 by 64 pixel small detection region B (see FIG. 18) from the upper left corner to the lower right corner of the detection region before recording is performed. Then, in the event that the dot density exceeds 30% even once therein, the recording is changed to recording where under-printing is performed with color ink (one-way recording). With the present embodiment, when the dot density exceeds 30% or more, the under-printing of color ink is performed for all black images in the detection region A. Also, if necessary, a waiting time is set for the above discharge paper waiting control. Further, in the event that the calculated dot density of all small detection regions in the detection region A does not exceed the threshold, one-pass reciprocal recording is performed.

Figure 19:
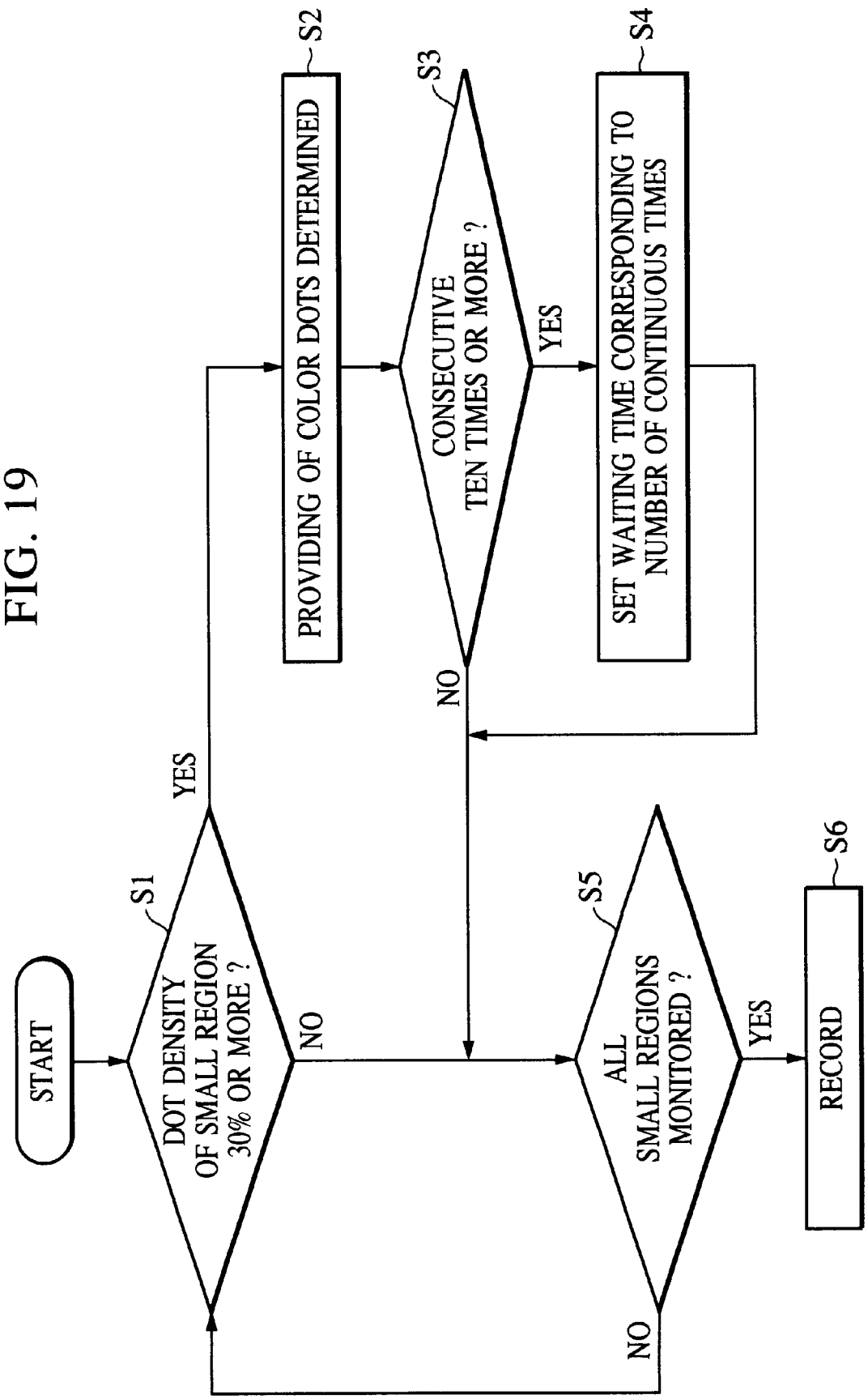
FIG. 19 is a flowchart which indicates control operations according to the first embodiment of the present invention.

The flowchart shown in FIG. 19 depicts an overview of the operation control as described above. To be brief, in the event that a dot density of 30% or more for the small detection region B is detected in Step S1, a decision is made in Step S2 to perform under-printing of color dots. In the event that the decision is made for color dots to be under-printed, color ink discharging data corresponding to the region A is created for discharging color ink onto the detection region A including the small detection region B. Moreover, the main scan direction is restricted in order to provide color ink to the face of the paper first. The dot density of black ink is calculated for all detected small detection regions, and the number of continuous (adjacent) small detection regions which exceed the threshold of the dot density (30% in this case), hereafter referred to as the "continuous number", is judged as to whether it is 10 or more (Steps S3, S5, and S1). In the event that the continuous number is judged to be 10 or more, the discharging paper waiting time is set according to the number of continuous times detected in Step S4, and subsequently, recording with color dots and black dots is performed based upon the setting results (Step S6). Note that the relationship between the continuous number of the small detection regions exceeding the threshold value and the recording method, the recording direction, and occurrence of waiting time, can be summarized in Table 2 as follows.

TABLE 2

Example of number of consecutive times exceeding threshold, and wait time settings

| | | Wait time | Under-printing | Printing direction |
|---|---|---|---|---|
| Continuous number of regions Detected | 0 times | 0 seconds | None | Both-way (Two-way) |
| | 1 time | 0 seconds | Yes | One-way |
| | 5 times | 0 seconds | Yes | One-way |
| | 10 times | 5 seconds | Yes | One-way |
| | 20 times | 10 seconds | Yes | One-way |
| | 30 times | 15 seconds | Yes | One-way |

As described above, with the present embodiment, since the under-printing is performed for black dot small regions with high density, the fixing speed of black ink is enhanced. Moreover, in the event that the dot density of black ink is high and black images are formed in a large area, discharging paper waiting time is set according to the extent thereof, so smearing due to soiled backs of paper can be prevented. Also, since under-printing is performed only for the detection regions where a long time is required for fixing, and the waiting time is set only for detection regions where it takes even longer for fixing, reduction in printing speed and the deterioration in character quality can be minimized, as compared with conventional arrangements wherein under-printing or fixation-waiting is always performed.

Note that with the present embodiment, under-printing is performed for all black images within the detection region A in scanning wherein under-printing is performed, but an arrangement may be made wherein under-color ink printing is performed only for the small detection regions where the black dot density exceeds the threshold. With this arrangement, in the event that under-printing of the color dots is decided upon, color ink discharging data corresponding to the region B is created for color ink to be discharged onto the small detection regions B. According to this configuration, the amount of color ink used for under-printing is reduced in comparison with cases wherein color ink is provided for the entirety of the detection region A, so running costs and cockling (a phenomena wherein the recording media wrinkles in the form of waves, due to a large ink amount provided to the recording medium) can be suppressed.

Also, in above description, a configuration has been described wherein the information on the provision conditions (provided dot density) of the low permeability black ink is acquired, the fixing state (fixing time) is judged based upon the information, and the provision conditions of high-permeability color ink (whether any ink is provided, and if so, how much) is decided upon, based on the judgement results. However, the first embodiment is not limited to this configuration.

For example, while a configuration has been described wherein the information on the dot density of black ink is employed as information regarding the provision conditions of black ink, the embodiment is not limited to this, and a configuration may be employed wherein information on data amount (data amount indicating black ink provision) corresponding to the predetermined regions (small detection regions or detection region) is used. That is to say, the ink provision data amount and the ink dot density (discharging duty) are correlated. Specifically, the acquired ink provision data can be used to judge the ink provision conditions for predetermined regions without calculating ink dot density, due to the relationship where the ink provision data amount corresponding to the predetermined region is large, the ink dot density within the above predetermined region is high, and, on the other hand, when the ink provision data amount corresponding to the predetermined region is small, the ink dot density within the above predetermined region is low. In this configuration, the threshold regarding whether or not to provide color ink is naturally defined by the data amount within the predetermined region. Specifically, control is made wherein, in the event that the discharging data amount of black ink corresponding to the predetermined region is larger than the threshold, color ink is discharged onto the region, and on other hand, in the event that the discharging data amount of black ink corresponding to a predetermined region is less than the threshold value, color ink is not discharged to that region.

In addition, when the fixing state (fixing time) of the black ink is judged based upon the information on the provision conditions of black ink, and the provision conditions of color ink (whether any is provided, and if so, how much, and so forth) are decided according to the judgment results, the judgment processing of the fixing conditions (fixing time) may be omitted. That is to say, the provision conditions of color ink can be determined from the information regarding the provision conditions of black ink without judgment of the above fixing state (fixing time) by the information regarding the provision conditions of black ink being related to the fixing state (fixing time) of black dots beforehand.

As described above, with the present embodiment, a decision is made whether or not to provide the high permeability second ink (e.g., color ink) to predetermined regions to which the first ink is provided, based upon the provision conditions of the low permeability first ink (e.g., black ink) to the predetermined region of the recording medium. Specifically, since color ink is provided to regions wherein the discharging duty of black ink is high, and color ink is not provided to regions wherein the discharging duty of black ink is low, the fixing time can be shortened while smearing can be prevented sufficiently.

Second Embodiment

A second embodiment according to the features of the present invention will now be described.

The recording medium which is most often used is recording paper which is typically called plain paper. Plain paper has a wide variety of fixing properties due to manufacturing methods, brands, or the like. Accordingly, control may be made wherein a low threshold is employed for recording paper with relatively low fixing properties, as well as setting the discharged paper waiting time to be long, and in the event that recording paper with relatively high fixing properties is used, a high threshold is employed and the discharged paper waiting time is set to be short. Accordingly, fixing control can be made according to the properties of the paper used. Specifically, the provision of color ink which matches the nature of the plain paper can be determined by control being made wherein, as indicated in Table 3, in the case of recording paper with relatively excellent fixing properties, high permeability color ink is provided for regions of which black dot density is 50% or more, in the case of recording paper with relatively inferior fixing properties, high permeability color ink is provided for regions of which black dot density is 25% or more, and in the case of recording paper with medium fixing properties, high permeability color ink is provided for regions of which black dot density is 30% or more.

Table 3 indicates the relationship between a threshold of a continuous number of times of detected regions which is set in the second embodiment, and the discharged paper waiting time, according to the fixing properties of plain paper. Excellent image quality can be obtained by setting the fixing conditions according to the recording paper which each printer user employs in accordance with the Table, even if the fixing properties of plain paper differ.

TABLE 3

Example of fixing settings, threshold, and waiting time

|  | Threshold | Excellent fixing 50% | Medium 30% | Inferior fixing 25% |
|---|---|---|---|---|
| Continuous number of adjacent regions | 5 times | 0 seconds | 0 seconds | 5 seconds |
|  | 10 times | 0 seconds | 5 seconds | 10 seconds |
|  | 20 times | 7 seconds | 10 seconds | 15 seconds |
|  | 30 times | 10 seconds | 15 seconds | 20 seconds |

Third Embodiment

A third embodiment according to the features of the present invention will now be described.

With the third embodiment, control is made wherein under-printing is not performed for recording paper with high fixing properties until the continuous number of small detection regions exceeds a threshold.

In the event of using recording paper with high fixing properties, recording operations can be performed efficiently without unnecessary under-printing or discharged paper waiting control by performing such control. That is to say, efficient fixing control can be performed wherein the provided amount of color ink, as well as time necessary for fixing, is minimized. Table 4 indicates a setting example of the relationship between the continuous number of small detection regions and under-printing, and the waiting time.

TABLE 4

Continuous number which exceeds threshold in third embodiment, and example of setting wait time

|  |  | Wait time | Under-printing |
|---|---|---|---|
| Continuous number of small detection regions | 0 times or more | 0 seconds | None |
|  | 3 times or more | 0 seconds | None |
|  | 5 times or more | 0 seconds | Yes |
|  | 10 times or more | 0 seconds | Yes |
|  | 20 times or more | 7 seconds | Yes |
|  | 30 times or more | 10 seconds | Yes |

Fourth Embodiment

A fourth embodiment according to features of the present invention will now be described.

While with the above first embodiment, a case where recording of color dots is performed before recording of black dots has been described. A case where recording of color dots is recorded following the recording of black dots will now be described with respect to the fourth embodiment.

As indicated in FIGS. 13A–13B, even in the event that color dots are provided following black dots, the fixing time can be controlled to be 4 seconds or less as long as the region does not exceed 320 pixels.

Table 5 indicates a setting example of the relationship between under-printing, recording direction, and discharged paper waiting time according to the present embodiment. As indicated in Table 5, in the event that the number of black dots exceeds a dot density (threshold) of 30% in a small detection region of 64 by 64 pixels, a decision is made to provide color dots. Subsequently, in the event that regions which exceed the threshold continue five times or more, the printing direction is changed to one-way recording. Moreover, in the case of regions which exceed the threshold continuously ten times or more, the discharged paper waiting time is set. Note that one-way recording is a type of recording wherein recording is performed by either the forward scan or return scan, while on the other hand, two-way recording is a type of recording wherein recording is performed by both the forward scan and return scan of the recording head.

By performing control such as described above, execution of one-way recording can be minimized, and accordingly printing time can be shortened.

TABLE 5

Continuous number exceeding threshold according to the fourth embodiment, and example of setting wait time

| | | Wait time | Color dots | Printing direction |
|---|---|---|---|---|
| Continuous number of small detection regions | 0 times or more | 0 seconds | None | Both-way |
| | 1 time or more | 0 seconds | Yes | Both-way |
| | 5 times or more | 0 seconds | Yes | One-way |
| | 10 times or more | 5 seconds | Yes | One-way |
| | 20 times or more | 10 seconds | Yes | One-way |
| | 30 times or more | 15 seconds | Yes | One-way |

Fifth Embodiment

A fifth embodiment according to features of the present invention will now be described.

With the first through fourth embodiments as described above, the provided amount of color ink (dot density) for performing under-printing or over-printing is fixed to a predetermined amount (e.g., 25% for each color). The provided amount (provision duty) of color ink may be reduced in the event that the continuous number of high duty (wherein the dot density exceeds 30%) small detection regions is small. For example, a threshold which represents an index of the size of the continuous number (for example, 10 times) is defined, and in the event that the continuous number of small detection regions is less than the above threshold (10 times), the amount of color ink to be provided is set to be less than the above predetermined amount (25%). Also, a plurality of different values (e.g., first threshold, second threshold, etc.) may be defined as thresholds. In this case, in the event that the consecutive number of small detection regions is greater than or equal to the first threshold (10 times), the provided amount is set to a first predetermined amount (for example, 25%). In the event that the consecutive number of small detection regions is less than the first threshold (10 times) but is greater than or equal to the second threshold (5 times), the provided amount is set to a second predetermined amount (for example 15%). And in the event that the consecutive number of small detection regions is less than the second threshold, provided amount is set to a third predetermined amount (for example, 10%). As described above, an arrangement may be made wherein the provided amount of color ink is altered corresponding to the continuous number of high duty small detection regions. Thus, with this configuration, the provided amount of color ink can be minimized according to the fixing time.

Also, with the above the first through fourth embodiments, in the event that color ink is provided to regions in which black ink is provided with high duty, the provided amount of color ink is set to be constant, regardless of the provided amount of black ink (duty). However, with the present invention, an arrangement may be made wherein the provided amount of color ink is altered according to the provided amount of black ink (duty). Specifically, the higher the duty of black ink is, the greater the provided amount of color ink should preferably be. For example, in the event that the duty of black ink is 100 to 70%, the provided amount of color ink is set to a first predetermined amount (for example, 25%), in the event that the duty of black ink is 69 to 50%, the provided amount of color ink is set to a second predetermined amount (for example, 15%), and in the event that the duty of black ink is 49 to 30%, the provided amount of color ink is set to a third predetermined amount (for example, 10%). Note that in the event that the duty of black ink is less than 30%, no color ink is to be provided. Thus, the provided amount of color ink is set to a minimal amount, according to the fixing time, due to the configuration wherein the amount of provided color ink is changed according to the amount of black ink provided (duty).

Moreover, an arrangement may be made wherein the amount of color ink to be provided is decided according to both the continuous number of high duty small detection regions and provided amount of black ink (duty). In this configuration, the greater the continuous number of small detection regions is and the greater the provided amount of black ink (duty) is, the greater the provided amount of color ink is set to be, while the smaller the continuous number of small detection regions is and the smaller the provided amount of black ink (duty) is, the smaller the provided amount of color ink is set to be. With this configuration as well, the provided amount of color ink is set to a minimal amount corresponding to the fixing time. Thus, unnecessary providing of color ink is done away with, and the quality of black images can be improved.

Sixth Embodiment

A sixth embodiment according to features of the present invention will now be described.

With the above first through fifth embodiments, when performing under-printing or over-printing, the dot density of black ink is not controlled. But an arrangement may be made wherein, for example, when an image region with poor fixing properties exists, such as wherein the dot density of black ink in small detection regions exceeds the threshold 30 times or more, control may be performed in which the dot density of black ink is reduced. Thereby the fixing of low fixing regions can be improved by the provided amount of black ink being reduced (dot density being reduced).

Seventh Embodiment

An example wherein black ink and color ink are provided with reactivity can be given as an even more preferable example. According to the seventh embodiment, the color ink has properties which cause black ink to be coagulated. For example, self-dispersing Carbon Black having anion radicals on the surface thereof is employed in the color material of the black ink, and ink in which magnesium sulfate salt is dissolved is used as the color ink. Using ink of such a chemical composition allows the color material of the black ink to coagulate due to the magnesium ions in the color ink.

On the other hand, when employing non-reactive black ink and color ink, a slight reduction of optical density may occur due to the color material of the black ink infiltrating into the paper surface by providing the color ink onto the black ink, depending on the type of plain paper. Conversely, in the event that reactivity is given to the black ink and color ink as described above, the black ink reacts with the color ink on the surface of the paper and coagulates, so high optical density can be maintained, as well as the color material of the black ink being sufficiently fixed on the upper face of the paper, and accordingly, sharp images can be obtained.

Other Embodiments

With the first through seventh embodiments described above, cases where the decision of color ink provision conditions (how much, if any, is provided, and so forth) are decided by the ink jet recording device have been described, but the present invention is by no means limited to these. That is to say, the decision of provision conditions of color ink (how much, if any, and so forth) may be performed by a printer driver of a host computer 306 connected to the ink jet recording device. Specifically, the deciding processing may be performed by the printer driver of the host computer 306, which decides provision conditions (presence of provision, provided amount, and so forth) of the high permeability second ink (e.g., color ink) based upon the information on provision conditions (dot density information or data amount) of the low permeability first ink (e.g., black ink) for the recording medium.

Also, an arrangement may be made wherein the printer driver of the host computer 306 performs not only the decision of provision conditions of color ink but also creating processing of color data in the event that the decision is made for color ink to be provided. That is to say, as described above, when the decision is made for the second ink (color ink) to be discharged onto a predetermined region on which the first ink (black ink) is provided, the data creating processing for creating the second ink discharging data corresponding to the predetermined region for the second ink being discharged onto the predetermined region is performed, and it should be noted that the present invention also encompasses arrangements wherein the printer driver performs such data creating processing.

The objects of the present invention can be achieved by an arrangement wherein a storage medium storing program code of software which realizes the functions of the above embodiments is provided in a system or device, and the computer (or CPU or MPU) of the system or device reads out and executes the program code stored in the storage medium.

In this case, the program code read out from the storage medium realizes the functions of the embodiments as described above, and the storage medium storing the program code and the program code compose the present invention.

In the event that the present invention is applied to the above storage medium, the storage medium stores, for example, the program code for performing the deciding processing which decides the provision conditions (how much is provided, if any, and so forth) of the high permeability second ink (e.g., color ink) based upon the information of the provision state (dot density information or data amount) of the low permeability first ink (e.g., black ink).

Accordingly, the program code for performing such deciding processing, or the storage medium storing the program code, composes the present invention.

Note that floppy disks, hard disks, optical disks, magneto-optical disks, CD-ROMs, CD-Rs, magnetic tape, non-volatile memory cards, ROM, or the like, may be used as the storage medium for supplying the program code.

The present invention also includes not only an arrangement wherein the computer executes the program code read out to realize the functions of the embodiments described above, but also an arrangement wherein an operating system running on the computer performs a part of or all of the actual processing for realizing the functions of the embodiments described above thereby, based upon instructions of the program code.

Moreover, the present invention includes an arrangement wherein the program code read out from the storage medium is written to a memory provided in a function extension board inserted in the computer or a function extension unit connected to the computer, and subsequently, a CPU provided in the function extension board or function extension unit performs a part of or all of the actual processing based on the instructions of the program code, thereby realizing the functions of the embodiments described above.

As described above, the present invention decides provision conditions (presence of provision or provided amount) of the high permeability second ink (e.g., color ink) based upon the information on provision conditions of the low permeability first ink (e.g., black ink) to the recording medium, and accordingly, fixing time can be shortened as well as smearing being prevented.

Hence, for example, the fixing speed can be raised for regions wherein the low permeability black dot density is high by performing under-printing or over-printing of the high permeability color ink.

While the present invention has been described with reference to what are presently considered to be the preferred embodiments, it is to be understood that the invention is not limited to the disclosed embodiments. The invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An ink jet recording method for recording on a recording medium by discharging a first ink and a second ink from first recording means and second recording means, respectively, based on image data, the first ink having a predetermined permeability with respect to the recording medium and the second ink having a permeability higher than the predetermined permeability, said method comprising the steps of:

deciding second provision conditions of the second ink for a predetermined region of the recording medium in which the first ink is to be provided based upon information on first provision conditions of the first ink for the predetermined region; and performing recording on the recording medium according to the first provision conditions of the first ink and the second provision conditions of the second ink decided in said deciding step.

2. An ink jet recording method for recording on a recording medium by discharging a first ink and second ink from first recording means and second recording means, respectively, based on image data, the first ink having a predetermined permeability with respect to the recording medium and the second ink having a permeability higher than the predetermined permeability, said method comprising the steps of:

acquiring information on first provision conditions of the first ink with respect to a predetermined region of the recording medium;

judging a fixing state of the first ink on the recording medium following a predetermined time period based on the information acquired in said acquiring step;

deciding second provision conditions of the second ink for the predetermined region of the recording medium to which the first ink is provided; and performing recording on the recording medium according to the first provision conditions of the first ink and the second provision conditions of the second ink decided in said deciding step.

3. An ink jet recording method according to either claim 1 or claim 2, wherein information on the first provision conditions of the first ink for the predetermined region comprises at least one of dot density of the first ink provided in the predetermined region and discharging data amount of the first ink in the predetermined region.

4. An ink jet recording method according to claim 3, wherein if the dot density of the first ink provided in the predetermined region is greater than or equal to a threshold value, the second ink is discharged in the predetermined region, and if the dot density of the first ink provided in the predetermined region is less than the threshold value, the second ink is not discharged in the predetermined region.

5. An ink jet recording method according to claim 3, wherein, if the discharging data amount of first ink in the predetermined region is greater than or equal to a threshold value, the second ink is discharged in the predetermined region, and if the discharging data amount of the first ink in the predetermined region is less than the threshold value, the second ink is not discharged in the predetermined region.

6. An ink jet recording method according to claim 1 or claim 2, wherein a one-way recording mode in which recording is performed by scanning the recording head either in a forward direction or in a return direction and a two-way recording mode in which recording is performed by scanning the recording head both in the forward direction and the return direction can be performed, and wherein a recording mode is set to either the one-way recording mode or to the two-way recording mode, based on information on the provision conditions of the first ink for the predetermined region.

7. An ink jet recording method according to claim 1 or claim 2, wherein transportation of the recording medium is temporarily interrupted following recording on the recording medium or recording on a subsequent recording medium based on information on the provision conditions of the first ink for the predetermined region.

8. An ink jet recording method according to claim 1 or claim 2, wherein the predetermined region of the recording medium is a region consisting of a constant number of pixels.

9. An ink jet recording method according to claim 8, wherein the information on the provision conditions of the first ink for the predetermined region includes information on a number of pixels in which the first ink is provided in the predetermined region.

10. An ink jet recording method according to claim 8, wherein, if the number of pixels in which the first ink is provided in the predetermined region is greater than or equal to a threshold value, the second ink is discharged in the predetermined region, and if the number of pixels in which the first ink is provided in the predetermined region is less than the threshold value, the second ink is not discharged in the predetermined region.

11. An ink jet recording method according to claim 1 or claim 2, wherein the first ink is black ink and the second ink is ink having a color other than black.

12. An ink jet recording method according to claim 1 or claim 2, wherein the first ink and the second ink react.

13. An ink jet recording device for recording on a recording medium, comprising:

first recording means for discharging a first ink having a predetermined permeability with respect to the recording medium based on image data;

second recording means for discharging a second ink having a permeability higher than the predetermined permeability based on image data;

deciding means for deciding second provision conditions of the second ink for a predetermined region of the recording medium in which the first ink is to be provided based upon information on first provision conditions of the first ink for the predetermined region; and recording control means for performing recording on the recording medium according to the first provision conditions of the first ink and the second provision conditions of the second ink decided by said deciding means.

14. An ink jet recording device for recording on a recording medium, comprising:

first recording means for discharging a first ink having a predetermined permeability with respect to the recording medium based on image data;

second recording means for discharging a second ink having a permeability higher than the predetermined permeability based on image data;

acquiring means for acquiring information on first provision conditions of the first ink with respect to a predetermined region of the recording medium;

judging means for judging a fixing state of the first ink on the recording medium following a predetermined time period based on the information acquired by said acquiring means;

deciding means for deciding second provision conditions of the second ink for the predetermined region of the recording medium to which the first ink is provided; and recording control means for performing recording on the recording medium according to the first provision conditions of the first ink and the second provision conditions of the second ink decided by said deciding means.

15. An image processing method for processing image data which is transported to an ink jet recording device for recording on a recording medium by discharging a first ink and a second ink from first recording means and second recording means, respectively, based on image data, the first ink having a predetermined permeability with respect to the recording medium and the second ink having a permeability higher than the predetermined permeability, said method comprising the steps of:

deciding whether or not the second ink is to be provided in a predetermined region of the recording medium in which the first ink is to be provided based on discharge data of the first ink for the predetermined region; and creating discharge data for discharging the second ink in the predetermined region if it is decided to provide the second ink in said deciding step.

16. An image processing method for processing data used for performing an ink jet recording method for recording on a recording medium by discharging a first ink and a second ink from first recording means and second recording means, respectively, based on image data, the first ink having a predetermined permeability with respect to the recording medium and the second ink having a permeability higher than the predetermined permeability, said method comprising the steps of:

deciding whether or not the second ink is to be provided in a predetermined region of the recording medium in which the first ink is to be provided based on discharge data of the first ink for the predetermined region; and creating discharge data for discharging the second ink in the predetermined region if it is decided to provide the second ink in said deciding step.

17. A computer-executable program for processing data used for performing an ink jet recording method for recording on a recording medium by discharging a first ink and a second ink from first recording means and second recording means, respectively, based on image data, the first ink having a predetermined permeability with respect to the recording medium and the second ink having a permeability higher than the predetermined permeability, said program comprising:

code for deciding whether or not the second ink is to be provided in a predetermined region of the recording medium in which the first ink is to be provided based on discharge data of the first ink for the predetermined region; and code for creating discharge data for discharging the second ink in the predetermined region if it is decided to provide the second ink in said deciding step.

18. A computer-readable storage medium for storing a computer-executable program according to claim 17.

* * * * *